US010707516B2

(12) United States Patent
Ando et al.

(10) Patent No.: US 10,707,516 B2
(45) Date of Patent: Jul. 7, 2020

(54) SHEET LAYERING JIG, METHOD FOR MANUFACTURING LAYERED PRODUCT, AND METHOD FOR MANUFACTURING SHEET-SHAPED SECONDARY CELL

(71) Applicant: KABUSHIKI KAISHA NIHON MICRONICS, Tokyo (JP)

(72) Inventors: Hidenori Ando, Tokyo (JP); Makoto Kikuta, Tokyo (JP); Gouichi Iwao, Tokyo (JP)

(73) Assignee: KABUSHIKI KAISHA NIHON MICRONICS, Tokyo (JP)

( * ) Notice: Subject to any disclaimer, the term of this patent is extended or adjusted under 35 U.S.C. 154(b) by 148 days.

(21) Appl. No.: 16/091,483

(22) PCT Filed: Mar. 15, 2017

(86) PCT No.: PCT/JP2017/010399
§ 371 (c)(1),
(2) Date: Oct. 4, 2018

(87) PCT Pub. No.: WO2017/175553
PCT Pub. Date: Oct. 12, 2017

(65) Prior Publication Data
US 2019/0123376 A1    Apr. 25, 2019

(30) Foreign Application Priority Data
Apr. 5, 2016   (JP) ................... 2016-075641

(51) Int. Cl.
*H01M 10/04*    (2006.01)
*B32B 37/18*    (2006.01)
*H01M 2/16*    (2006.01)

(52) U.S. Cl.
CPC ......... *H01M 10/0404* (2013.01); *B32B 37/18* (2013.01); *H01M 2/1673* (2013.01);
(Continued)

(58) Field of Classification Search
None
See application file for complete search history.

(56) References Cited

U.S. PATENT DOCUMENTS

2015/0162590 A1\*   6/2015   Takahashi ......... H01M 10/0525
429/161

FOREIGN PATENT DOCUMENTS

| JP | S62183649 U | 11/1987 |
| JP | H0794321 A | 4/1995 |

(Continued)

OTHER PUBLICATIONS

ISA Japan Patent Office, International Search Report Issued in Application No. PCT/JP2017/010399, dated May 30, 2017, WIPO, 4 pages.

(Continued)

*Primary Examiner* — Rena Dye Cronin
(74) *Attorney, Agent, or Firm* — McCoy Russell LLP

(57) ABSTRACT

A sheet layering jig of the present invention include a sheet holding portion that includes a sheet holding side face to hold sheets and is arranged on a stage so that the sheet holding side face faces a work space; an electrode holding portion that includes an electrode holding side face to hold electrodes and is arranged on the stage so that the electrode holding side face faces the work space, a sheet holding guide that holds the sheets along the sheet holding side face, an electrode holding guide that holds the electrodes along the electrode holding side face, and a magnetic circuit that generates magnetic force to generate a gap between the sheets.

13 Claims, 23 Drawing Sheets

(52) U.S. Cl.
CPC ........ *H01M 10/04* (2013.01); *H01M 10/0413* (2013.01); *H01M 10/0436* (2013.01)

(56) References Cited

FOREIGN PATENT DOCUMENTS

| | | | | |
|---|---|---|---|---|
| JP | H0812107 A | 1/1996 | | |
| JP | 2009084025 A | 4/2009 | | |
| JP | 2012056648 A | 3/2012 | | |
| JP | 2012091372 A | 5/2012 | | |
| JP | 2014078464 | * | 5/2014 | ............ H01M 10/04 |
| JP | 2014078464 A | 5/2014 | | |
| JP | 2014196177 A | 10/2014 | | |
| JP | 2015130329 A | 7/2015 | | |
| JP | 2015163546 A | 9/2015 | | |

OTHER PUBLICATIONS

Korean Intellectual Property Office, Office Action Issued in Application No. 10-2018-7031983, dated Jan. 29, 2020, 13 pages.

* cited by examiner

SHEET LAYERING JIG, METHOD FOR MANUFACTURING LAYERED PRODUCT, AND METHOD FOR MANUFACTURING SHEET-SHAPED SECONDARY CELL

CROSS REFERENCE TO RELATED APPLICATIONS

The present application is a U.S. National Phase of International Patent Application Serial No. PCT/JP2017/010399 entitled "SHEET LAMINATION JIG, LAMINATED PRODUCT PRODUCTION METHOD, AND SHEET-TYPE SECONDARY BATTERY PRODUCTION METHOD," filed on Mar. 15, 2017. International Patent Application Serial No. PCT/JP2017/010399 claims priority to Japanese Patent Application No. 2016-075641, filed on Apr. 5, 2016. The entire contents of each of the above-mentioned applications are hereby incorporated by reference in their entirety for all purposes.

TECHNICAL FIELD

The present invention relates to a technology for manufacturing a layered product in which a component is inserted between sheets.

BACKGROUND ART

Patent Document 1 discloses a layering apparatus that layers positive electrode foils, negative electrode foils, and separators in sequence. The layering apparatus of Patent Document 1 includes a layer base, a conveying device to suck and convey sheet bodies such as the positive electrode foils, the negative electrode foils, and the separators on the layer base, and a holding mechanism that holds the sheet bodies.

CITATION LIST

Patent Literature

Patent Document 1: Japanese Unexamined Patent Application Publication No. 2014-78464

SUMMARY OF INVENTION

Technical Problem

According to Patent Document 1, the positive electrode foils, the negative electrode foils, and the separators are conveyed to the layering apparatus by the conveying device. For example, in a process of separator layering, a separator is conveyed to the layering apparatus by the conveying device. Then, the separator is layered by moving the holding mechanism to a retreat position. In a process of negative electrode foil layering after the process of separator layering is completed, the conveying device sucks and holds a negative electrode foil and conveys the negative electrode foil to the layering apparatus. Then, the negative electrode foil is layered by moving the holding mechanism to the retreat position.

According to Patent Document 1, there has been a problem that the conveying device is required to convey a sheet body in each layering process. Since picking-placing operation of a sheet body is required for each, manufacturing time is elongated. In particular, when the number of sheets to be layered is large, the total time required for conveyance is elongated and productivity is reduced.

In view of the above, an object of the present invention is to provide a technology that enables easy manufacturing of a layered product in which a component is inserted between sheets.

Solution to Problem

A sheet layering jig according to an aspect of the present embodiment is a sheet layering jig for manufacturing a layered product in which a component is arranged between layered sheets, the sheet layering jig including a stage, a sheet holding portion that includes a sheet holding side face to hold a plurality of sheets and is arranged on the stage so that the sheet holding side face faces a work space on the stage, a component holding portion that includes a component holding side face to hold a plurality of components and is arranged on the stage so that the component holding side face faces the sheet holding side face as sandwiching the work space, a sheet holding guide that holds the sheets along the sheet holding side face, a component holding guide that holds the components along the component holding side face, and a magnetic circuit that is arranged at the sheet holding portion and generates magnetic force to generate a gap between the sheets at an end region of the sheets.

The above sheet layering jig may further includes a sheet grasping member that grasps a single sheet out of the sheets arranged along the sheet holding side face in a state that a gap is generated between the sheets by the magnetic force of the magnetic circuit so that the single sheet is flipped toward the work space.

In the above sheet layering jig, the magnetic circuit may include a plurality of magnets arranged in line in a first direction with the same poles of adjacent magnets being faced to each other, a first yoke arranged at each of both sides of each magnet, a nonmagnetic member arranged at a position corresponding to each first yoke, and a second yoke arranged at a position corresponding to each magnet.

In the above sheet layering jig, the magnets may be permanent magnets and the second yokes and the nonmagnetic members may be arranged movably in the first direction.

In the above sheet layering jig, the first direction may be oriented along the sheet holding side face, three or more of the permanent magnets may be arranged in line in the first direction, and magnetic force of the permanent magnets arranged at a center region and one end region of the sheet holding side face with respect to the first direction may be smaller than magnetic force of the permanent magnet arranged at the other end region of the sheet holding side face.

In the above sheet layering jig, the magnets may be electric magnets.

In the above sheet layering jig, three or more of the electric magnets may be arranged in line in the first direction, the first direction may be oriented along the sheet holding side face, and current may be flown to the electric magnets so that magnetic force of the electric magnets arranged at a center region and one end region of the sheet holding side face with respect to the first direction is smaller than magnetic force of the electric magnet arranged at the other end region of the sheet holding side face.

The above layering jig may further include a component flipping member that is arranged between the component holding side face and the components held along the component holding side face. Here, the components may be arranged in line along an insertion direction of the component flipping member, and the component flipping member may flip the components one by one toward the work space.

In the above layering jig, the magnetic circuit may include a permanent magnet, a first yoke arranged at one end side of the permanent magnet, a second yoke arranged at the other end side of the permanent magnet, a first nonmagnetic member arranged at an upper end side of the permanent magnet, and a second nonmagnetic member arranged at a lower end side of the permanent magnet.

In the above layering jig, the permanent magnet may be rotatable about a rotational axis along a first direction on the sheet holding side face.

A method according to an aspect of the present embodiment is a method for manufacturing a layered product using the abovementioned sheet layering jig, the method including steps of arranging the sheet holding portion and the plurality of sheets on the stage; holding the sheets along the sheet holding side face by lifting the sheets placed at the work space; arranging the component holding portion and the plurality of components on the stage; holding the components along the component holding side face by lifting the components placed at the work space; generating a gap between the sheets at an end region of the sheets using the magnetic circuit; and flipping a topmost sheet out of the plurality of sheets toward the work space with a gap generated between the sheets, and thereafter, flipping one more components out of the plurality of components on the flipped topmost sheet.

A method according to an aspect of the present embodiment is a method for manufacturing a layered product using the abovementioned sheet layering jig, the method including a first step to hold the sheets on the sheet holding side face in a state that one pole of the permanent magnet is located at a position corresponding to the first nonmagnetic member and the other pole of the permanent magnet is located at a position corresponding to the second nonmagnetic member; and a second step to move one pole of the permanent magnet to a position corresponding to the first yoke and the other pole of the permanent magnet to a position corresponding to the second yoke by rotating the permanent magnet about the rotational axis.

A method according to an aspect of the present embodiment is a method for manufacturing a sheet-shaped secondary cell with the abovementioned method for manufacturing a layered product. Here, the sheets may be unit cell sheets each including a charging layer, and the components may be electrodes to be connected to the unit cell sheets.

Advantageous Efffects of Invention

According to the present invention, it is possible to provide a technology that enables easy manufacturing of a layered product in which a component is inserted between sheets.

DESCRIPTION OF EMBODIMENTS

In the following, description will be provided on examples of embodiments of the present invention with reference to the drawings. The description in the following is simply for preferable embodiments of the present invention and is not intended to limit the scope of the present invention to the following embodiments.

First Embodiment

Figure 1:
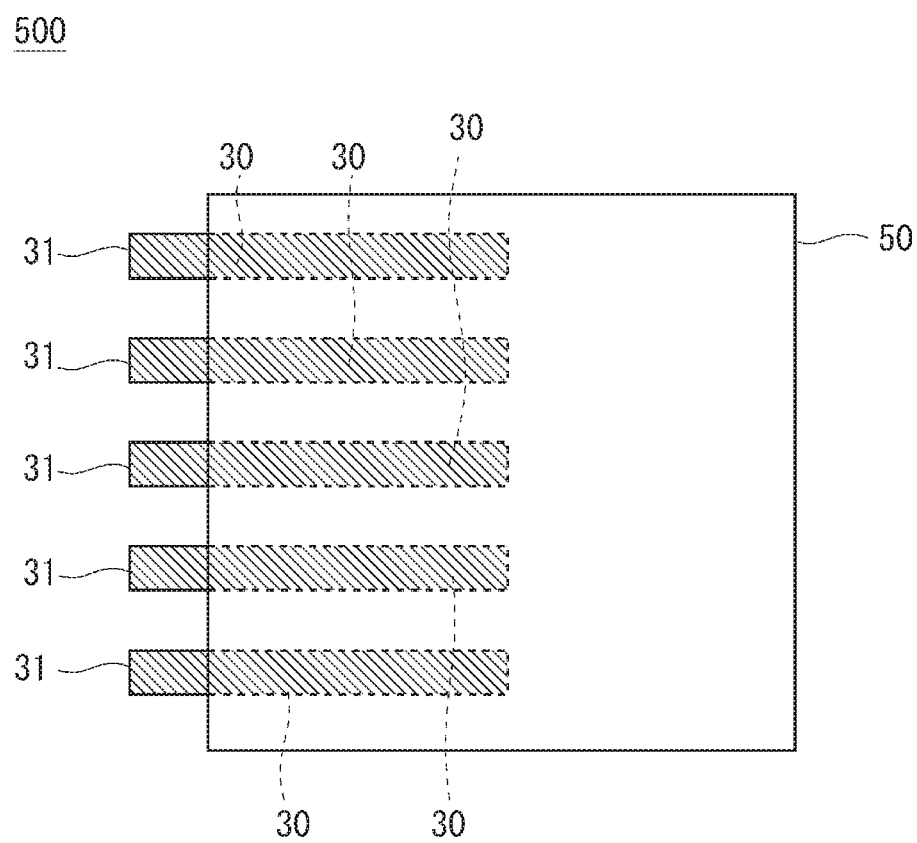
FIG. 1 is a plane view schematically illustrating a structure of a sheet-shaped secondary cell being a layered product.
Figure 2:
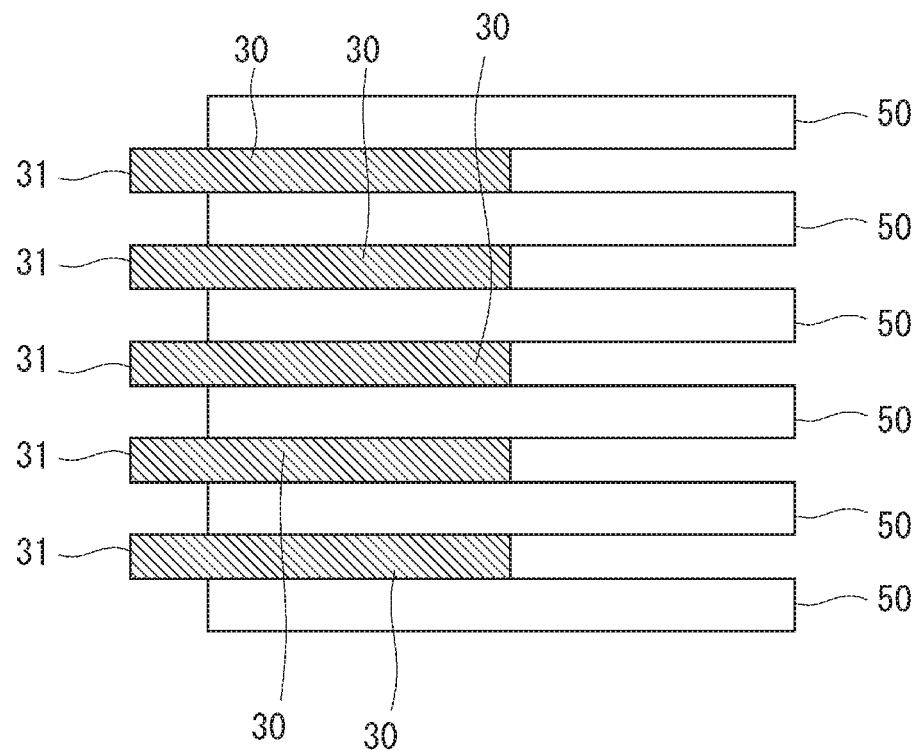
FIG. 2 is a sectional side view schematically illustrating a structure of the sheet-shaped secondary cell being a layered product.

First, description will be provided on a structure of a sheet-shaped secondary cell being an example of a layered product to be manufactured with a manufacturing method of an embodiment with reference to FIGS. 1 and 2. FIG. 1 is a plane view illustrating a structure of a sheet-shaped secondary cell 500. FIG. 2 is a sectional side view of the sheet-shaped secondary cell 500.

The sheet-shaped secondary cell 500 includes a plurality of sheets 50 and a plurality of electrodes 30. The sheets 50 are layered as illustrated in FIG. 2. As described later, each sheet 50 is a unit cell sheet including a charging layer and the like. The electrode 30 is inserted between two adjacent sheets 50. That is, the sheet 50 and the electrode 30 are placed alternately in the thickness direction (upper-lower direction in FIG. 2). The electrode 30 is a belt-shaped sheet electrode with the longitudinal direction thereof oriented in the lateral direction in FIG. 1.

In a plane view, the electrodes 30 are arranged as being shifted to one another to form a comb-tooth electrode. That is, in the plane view, the electrodes 30 are arranged not to be overlapped. As illustrated in FIG. 1, a part of each electrode 30 is protruded from the sheet 50 in a plane view. The portion of the electrode 30 protruded from the sheet 50 serves as a tab portion 31. The tab portions 31 of the electrodes 30 are connected with a tab lead (not illustrated) or the like, so that the sheets 50 each being a unit cell sheet are connected in parallel or in series.

Each sheet 50 has, for example, a size of 100 mm by 100 mm and a thickness of 10 um. Although six pieces of the sheets 50 are layered in FIG. 1, the number of layers of the sheets 50 is not specifically limited. For example, ten pieces of the sheets 50 may be layered. Each sheet 50 is a magnetic sheet made of, for example, a SUS sheet.

In FIGS. 1 and 2, a single electrode 30 is arranged between two sheets 50. However, the number of the electrodes 30 arranged between the sheets 50 may be two or more. That is, two or more electrodes 30 may be arranged between the sheets 50. Here, it is not necessarily required that the electrode 30 is arranged at every space between the respective sheets 50. For example, the electrode 30 may be arranged at every two or three sheets 50. Further, a component to be arranged between the sheets 50 is not limited to the electrode 30. For example, a sheet-shaped component such as an insulating member and an adhesive member may be arranged between the sheets 50.

Figure 3:
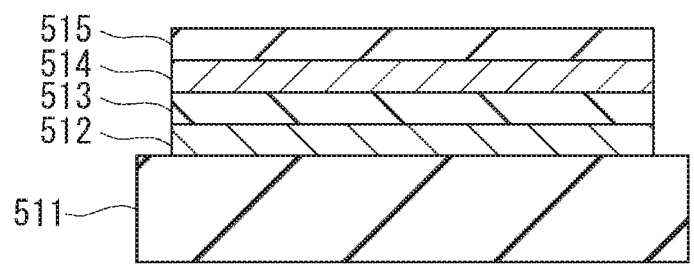
FIG. 3 is a sectional side view schematically illustrating a structure of a secondary cell.

FIG. 3 is a sectional view illustrating a structure of a cell formed as a single sheet 50. The sheet 50 has a layer structure in which an n-type metal oxide semiconductor layer 512, a charging layer 513 for being charged with energy, a p-type metal oxide semiconductor layer 514, and a second electrode 515 are layered on a substrate 511 on the order thereof.

The substrate 511 is formed of a conductive material such as metal and serves as a first electrode. In the present embodiment, the substrate 511 serves as a negative electrode. For example, a metal foil sheet such as a SUS sheet may be used as the substrate 511.

The n-type metal oxide semiconductor layer 512 is formed on the substrate 511. For example, titanium dioxide (TiO2) may be used as a material of the n-type metal oxide semiconductor layer 512.

It is possible to use n-type metal oxide semiconductor particles as a material of the charging layer 513. The n-type metal oxide semiconductor becomes to the layer having a charge function by being irradiated with ultraviolet. The charging layer 513 is formed of a material including n-type metal oxide semiconductor and an insulting material. It is preferable to use titanium dioxide, tin oxide, or zinc oxide as a material of the n-type metal oxide semiconductor that is capable of being used for the charging layer 513. It is also possible to use a material in which any two or three of titanium dioxide, tin oxide, and zinc oxide are combined.

The p-type metal oxide semiconductor layer 514 is formed on the charging layer 513. It is possible to use nickel oxide (NiO), copper-aluminum oxide (CuAlO2), or the like as a material of the p-type metal oxide semiconductor layer 514.

The second electrode 515 is formed on the p-type metal oxide semiconductor layer 514. The second electrode 515 serves as a positive electrode. A conductive film such as a metal film is used for the second electrode 515. A layered film of chromium and palladium or an aluminum film is formed to lower resistance as the second electrode 515. A metal electrode formed of chromium or copper may be used as the second electrode 515. A silver alloy film including aluminum or the like may be used as another metal electrode. Examples of a forming method for the above include vapor phase film formation such as sputtering, ion plating, electron beam deposition, vacuum deposition, and chemical deposition. Further, a metal electrode may be formed with an electrolytic plating process, a non-electrolytic plating process, or the like. In general, it is possible to use copper, copper alloy, nickel, aluminum, silver, gold, zinc, tin, or the like as a metal to be used for plating.

Here, in the present embodiment, the layers on the substrate 511 may be arranged in the opposite order. For example, it is possible that the substrate 511 is formed of a conductive material to be a positive electrode and the second electrode 515 serves as a negative electrode. In this case, it is simply required that positions of the n-type metal oxide semiconductor layer 512 and the p-type metal oxide semiconductor layer 514 are replaced with each other. That is, the p-type metal oxide semiconductor layer 514 is located below the charging layer 513 and the n-type metal oxide semiconductor layer 512 is located on the charging layer 513.

A material in which an insulating material and n-type metal oxide semiconductor are mixed is used as a material of the charging layer 513. In the following, detailed description will be provided on the charging layer 513. For the charging layer 513, silicon oil is used as a material of the insulating material and titanium dioxide is used as a material of the n-type metal oxide semiconductor.

Titanium dioxide, tin oxide, or zinc oxide is used as a material of the n-type metal oxide semiconductor to be used for the charging layer 513. Such n-type metal oxide semiconductor is obtained through decomposition of aliphatic acid salt of the above metals in a manufacturing process. Here, aliphatic acid salt of a metal to be used is capable of being varied into metal oxide through decomposition or burning by being irradiated with ultraviolet under an oxidizing atmosphere or being burnt.

Here, it is preferable that the aliphatic acid salt is salt of aliphatic acid and a metal on the grounds of easiness of being decomposed or burnt with heat, high solvent-solubility, fine composition of a film after being decomposed or burnt, being inexpensive with easy care, easiness of composition of a metal and salt, and the like.

Then, capacity of the sheet-shaped secondary cell 500 can be heightened by layering the sheets 50 as the sheet 50 illustrated in FIG. 3 being the unit cell sheet. For example, for connecting the sheets 50 in parallel, two sheets 50 are layered with the second electrodes 515 thereof faced to each other and the electrode 30 is inserted to a space between the two sheets 50. Here, it is also possible to connect the sheets 50 in parallel by layering the two sheets 50 with the substrates 511 faced to each other. Thus, since the electrodes of the two sheets 50 having the same polarity are connected with the electrode 30, the sheets 50 can be connected in parallel.

For connecting the sheets 50 in series, two sheets 50 are layered with the second electrode 515 and the substrate 511 faced to each other and the electrode 30 is inserted to a space between the sheets 50. Thus, since the second electrode 515 (positive electrode) of one sheet 50 and the substrate 511

(negative electrode) of the other sheet 50 are connected, the sheets 50 can be connected in series.

In FIG. 3, the n-type metal oxide semiconductor layer 512, the charging layer 513 for being charged with energy, the p-type metal oxide semiconductor layer 514, and the second electrode 515 are formed only on one face of the substrate 511. However, it is also possible that the n-type metal oxide semiconductor layer 512, the charging layer 513, the p-type metal oxide semiconductor layer 514, and the second electrode 515 are formed on each face of the substrate 511.

As described above, the sheets 50 are layered and the electrode 30 is arranged between the sheets 50, and then, the tab portions 31 of the electrodes 30 are connected with the tab lead. Thus, a number of sheets 50 can be connected in parallel or in series. Accordingly, capacity of the sheet-shaped secondary cell 500 having layered sheets 50 can be heightened.

In the present embodiment, a sheet layering jig for arranging the electrode 30 at a space between the layered sheets 50 is used in a manufacturing process of the sheet-shaped secondary cell 500. Here, a magnetic circuit for separating the sheets 50 is arranged in the sheet layering jig. In the following, a basic structure of the magnetic circuit will be described before describing the sheet layering jig.

Figure 4:
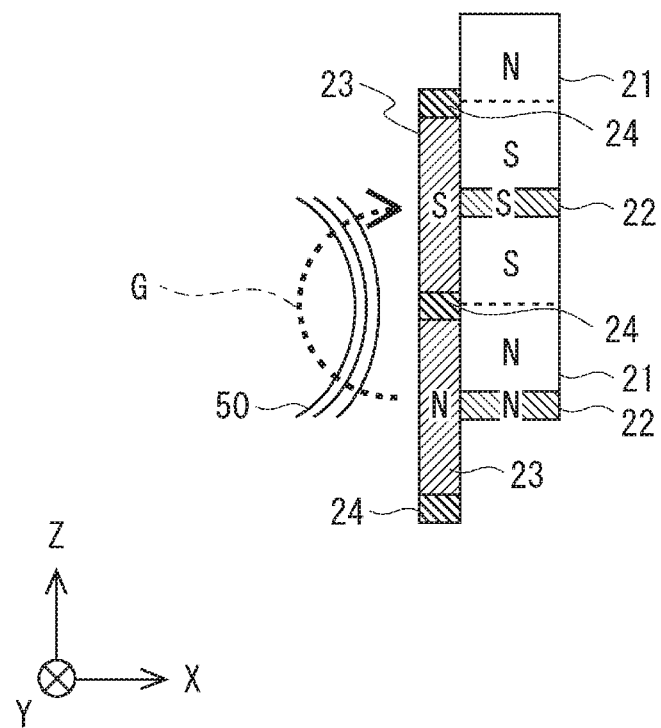
FIG. 4 is a view illustrating a basic structure of a magnetic circuit.

FIG. 4 is a view illustrating a basic structure of a magnetic circuit 20. The magnetic circuit 20 is arranged to generate magnetic force to separate a plurality of sheets 50. Specifically, the sheets 50 are placed above the magnetic circuit 20. Owing to magnetic force generated by the magnetic circuit 20, gaps between the sheets 50 become large at ends of the sheets 50.

The magnetic circuit 20 includes permanent magnets 21, first yokes 22, second yokes 23, and nonmagnetic members 24. In FIG. 4, two permanent magnets 21 are arranged side by side in Z direction. Here, the two permanent magnets 21 are arranged with the same poles faced to each other. In FIG. 4, S poles of the two permanent magnets 21 are faced to each other.

The magnetic circuit 20 includes two first yokes 22. The two first yokes 22 are arranged at both ends of the lower permanent magnet 21, respectively. Accordingly, the upper first yoke 22 is arranged between the two permanent magnets 21. The two first yokes 22 control orientation of magnetic lines directing from the upper permanent magnet 21 to the lower permanent magnet 21.

The magnetic circuit 20 includes three nonmagnetic members 24. The upper nonmagnetic member 24 and the center nonmagnetic member 24 are arranged at positions corresponding to the permanent magnets 21, respectively. In other words, each of the two nonmagnetic members 24 is arranged at a center position in Z direction between an N pole and an S pole of the corresponding permanent magnet 21 (indicated by a dotted line between the N pole and the S pole in FIG. 4). That is, each nonmagnetic member 24 is arranged at the center of the corresponding permanent magnet 21 in Z direction.

The second yokes 23 are arranged at positions corresponding to the first yokes 22, respectively. The second yokes 23 are larger in Z direction than the first yokes 22. Accordingly, the upper second yoke 23 is extended from a position corresponding to the upper first yoke 22 to a position corresponding to the lower permanent magnet 21. Here, each of the second yokes 23 is not extended between positions corresponding to both poles of the corresponding permanent magnet 21.

That is, the upper second yoke 23 is arranged only at positions corresponding to the upper first yoke 22 and the S poles of the upper-lower permanent magnets 21. Accordingly, magnetic force of the permanent magnets 21 arranged at both sides of the upper first yoke 22 is concentrated to the upper first yoke 22. Further, the concentrated magnetic force is concentrated to the upper second yoke 23 that is contacted to the upper first yoke 22.

Owing to that magnetic force generated at the magnetic circuit 20 is concentrated in a specific direction as described above, magnetic lines are strengthened in X direction and reach the sheets 50 through a face of the second yokes 23. The sheets 50 can be curved with the magnetic force of the magnetic circuit 20. The magnetic lines B generated by the magnetic circuit 20 are parabola-shaped, so that the sheets 50 can be curved along the parabola shape. Curvature can be varied for each of the sheets 50 by generating appropriate magnetic force, so that gaps between the sheets 50 can be enlarged at ends of the sheets 50. Accordingly, it becomes easy for an operator to hold an end of a sheet 50 with tweezers or the like. Thus, a single sheet 50 can be easily separated from the plurality of sheets 50.

Figure 5:
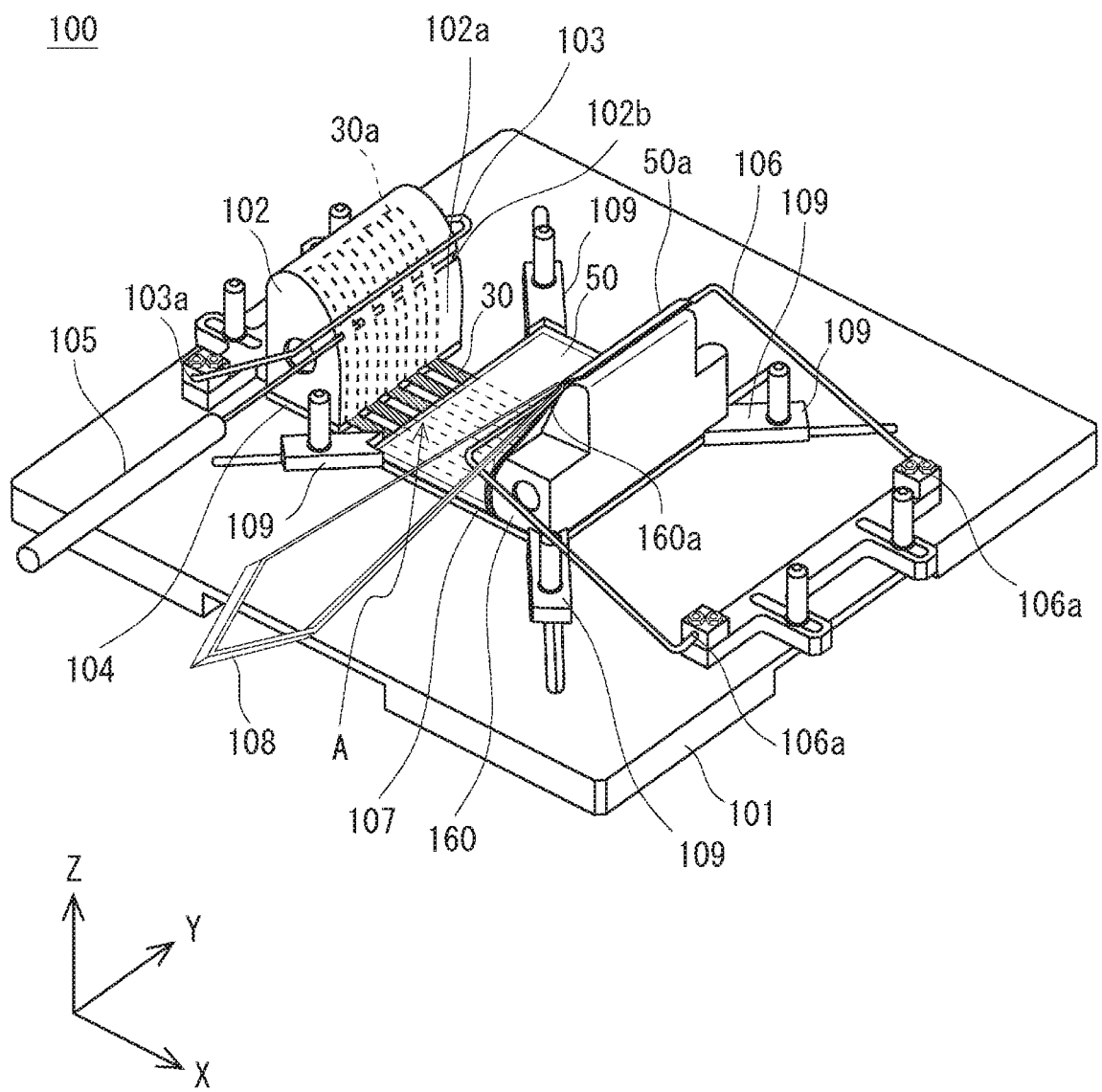
FIG. 5 is a perspective view illustrating a structure of a sheet layering jig of a first embodiment.
Figure 6:
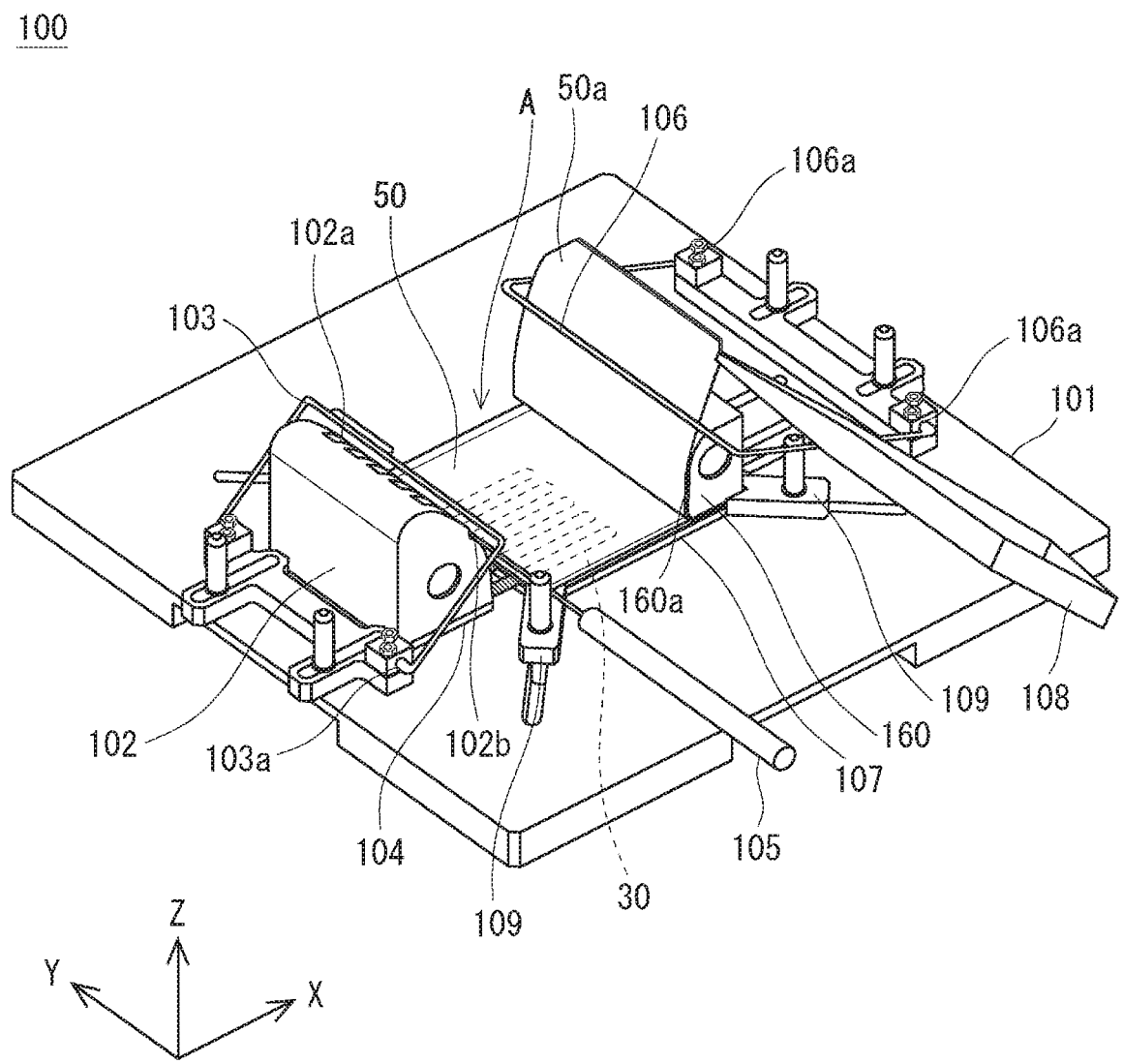
FIG. 6 is a perspective view illustrating a structure of the sheet layering jig of the first embodiment.
Figure 7:
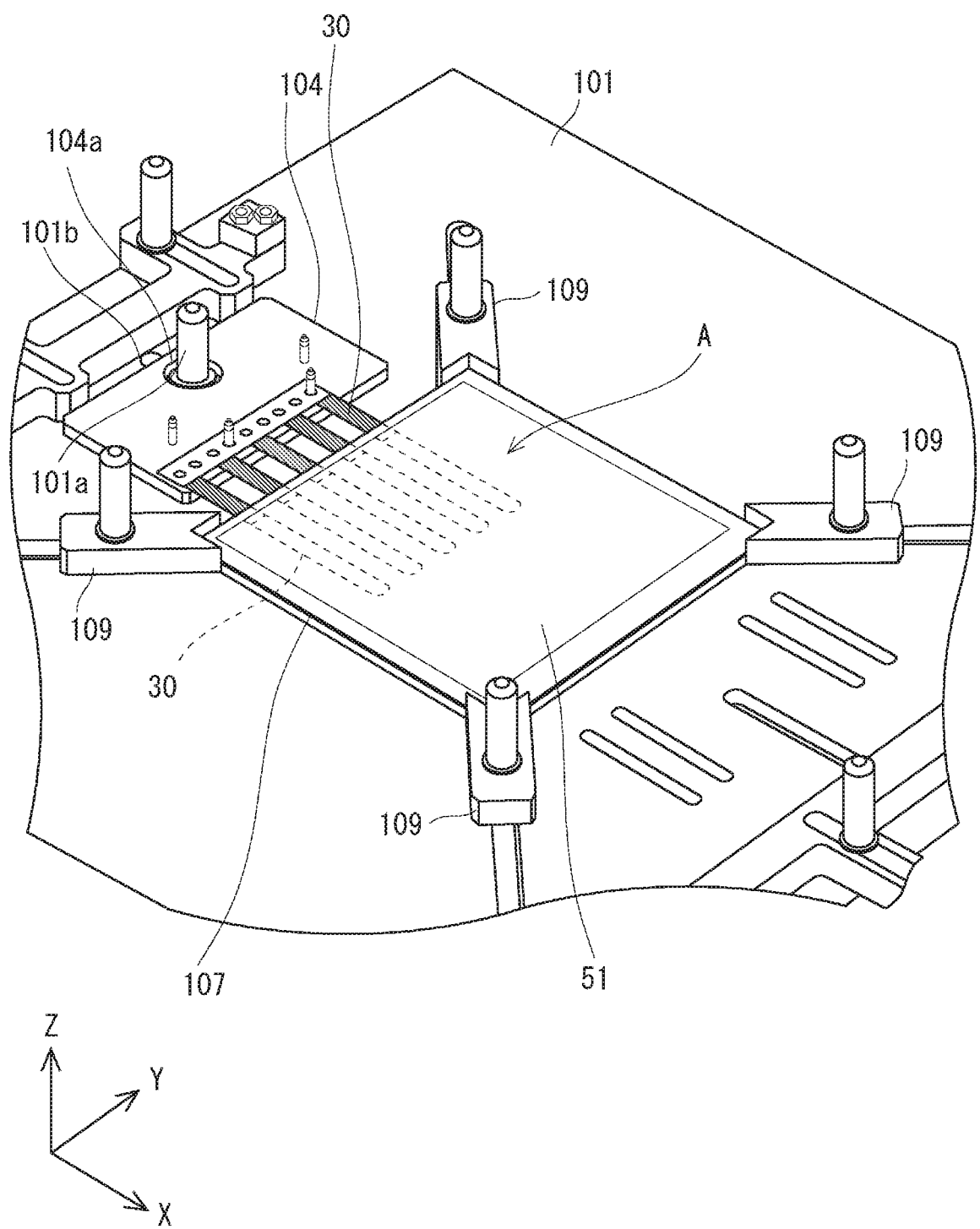
FIG. 7 is a perspective view schematically illustrating a main part of the sheet layering jig.

Next, description will be provided on a structure of the sheet layering jig of the present embodiment with reference to FIGS. 5 to 7. FIGS. 5 and 6 are perspective views illustrating a structure of a sheet layering jig 100. FIG. 7 is a perspective view illustrating the structure of the sheet layering jig 100 with a part thereof eliminated. In FIG. 7, the plurality of layered sheets 50 are illustrated as a layered body 51. Description with FIGS. 5 to 7 is provided using an XYZ orthogonal coordinate system with the vertical direction being Z direction and the horizontal plane being an XY plane.

The sheet layering jig 100 includes a stage 101, an electrode holding portion 102, an electrode holding guide 103, an electrode-use pallet 104, an electrode flipping rod 105, a sheet holding guide 106, a sheet-use pallet 107, tweezers 108, positioning blocks 109, and a sheet holding portion 160.

A specific region on the stage 101 serves as a work space A where the sheets 50 are layered and the sheet-shaped secondary cell 500 is manufactured. That is, a process of placing an electrode 30 on a sheet 50 and a process of placing a sheet 50 on the electrode 30 are performed repeatedly at the work space A. Thus, the sheet-shaped secondary cell 500 as illustrated in FIG. 2 is manufactured. Here, end sides of the rectangular sheets 50 are in parallel to X direction and Y direction, respectively.

The electrode holding portion 102 and the sheet holding portion 160 are attached on the stage 101 as being faced to each other with the work space A sandwiched thereby. The electrode holding portion 102 is arranged at −X side and the sheet holding portion 160 is arranged at +X side with respect to the work space A. Thus, the electrode holding portion 102 and the sheet holding portion 160 are arranged as being distanced in X direction.

The electrode holding portion 102 includes an electrode holding side face 102a for holding a plurality of the electrodes 30. The electrode holding portion 102 is arranged so that the electrode holding side face 102a faces the work space A. That is, a side face of the electrode holding portion 102 on the work space A side is the electrode holding side face 102a. In FIG. 5, the electrodes 30 held on the electrode holding side face 102a are illustrated with dotted lines as electrodes 30a. In the manufacturing process of the sheet-shaped secondary cell 500, the electrodes 30a held on the electrode holding side face 102a are flipped one by one onto the sheets 50 placed at the work space A. Thus, the electrodes 30 are placed on the sheets 50. Holding operation of the electrodes 30 by the electrode holding portion 102 will be described later.

The sheet holding portion 160 includes a sheet holding side face 160*a* for holding a plurality of the sheets 50. The sheet holding portion 160 is arranged so that the sheet holding side face 160*a* faces the electrode holding side face 102*a* as sandwiching the work space A therebetween. That is, a side face of the sheet holding portion 160 on the work space A side is the sheet holding side face 160*a*. In FIGS. 5 and 6, the sheets 50 held on the sheet holding side face 160*a* are illustrated as sheets 50*a*. In the manufacturing process of the sheet-shaped secondary cell 500, the sheets 50*a* held on the sheet holding side face 160*a* are caused to fall one by one onto the electrodes 30 placed at the work space A. Thus, the sheets 50 are placed on the electrodes 30. Holding operation of the sheets 50 by the sheet holding portion 160 will be described later.

As described above, the electrode holding side face 102*a* and the sheet holding side face 160*a* are arranged to be faced to each other as sandwiching the work space A. In other words, the work space A is a region placed between the electrode holding side face 102*a* and the sheet holding side face 160*a*. The electrode holding side face 102*a* and the sheet holding side face 160*a* are curved to be mutually apart toward the upper side. As illustrated in FIG. 5, the electrode holding side face 102*a* is curved to −X side toward the upper side (toward +Z side). As illustrated in FIG. 6, the sheet holding side face 160*a* is curved to +X side toward the upper side.

The sheet-use pallet 107 is arranged between the stage 101 and the sheet holding portion 160. The sheet-use pallet 107 is a plate-shaped member having a size corresponding to the sheets 50. The layered sheets 50 are placed on the sheet-use pallet 107. The sheet holding portion 160 is arranged on the sheets 50 placed on the sheet-use pallet 107. The sheet holding portion 160 is arranged on an end of the sheets 50 on +X side. That is, the sheets 50 and the sheet-use pallet 107 are arranged as being extended toward −X side from the sheet holding portion 160. One end of the sheets 50 is pinched by the sheet-use pallet 107 and the sheet holding portion 160.

The sheet-use pallet 107 is a rectangular plate-shaped member and has positioning blocks 109 in the vicinities of four corners. As illustrated in FIG. 7, corners of the layered body 51 and the sheet-use pallet 107 are arranged to be contacted to the positioning blocks 109, respectively. Thus, the layered body 51 is placed at a predetermined position.

As illustrated in FIGS. 5 and 6, the sheet holding guide 106 is attached to the stage 101 via a rotational shaft 106*a*. The sheet holding guide 106 is formed of rod-like metal or rod-like resin curved into a predetermined shape. The sheet holding guide 106 is rotated about the rotational shaft 106*a*. The rotational shaft 106*a* is arranged on +X side of the sheet holding portion 160. The sheet holding guide 106 is extended from the rotational shaft 106*a* to −X side of the sheet holding portion 160. A part of the sheet holding guide 106 is arranged on the sheet holding side face 160*a* side of the sheet holding portion 160.

Owing to that the sheet holding guide 106 lifts the sheets 50 placed on the sheet-use pallet 107, the sheets 50 are held along the sheet holding side face 160*a*. Since the sheet holding side face 160*a* is curved, the sheets 50 are held as being curved as well.

Figure 8:
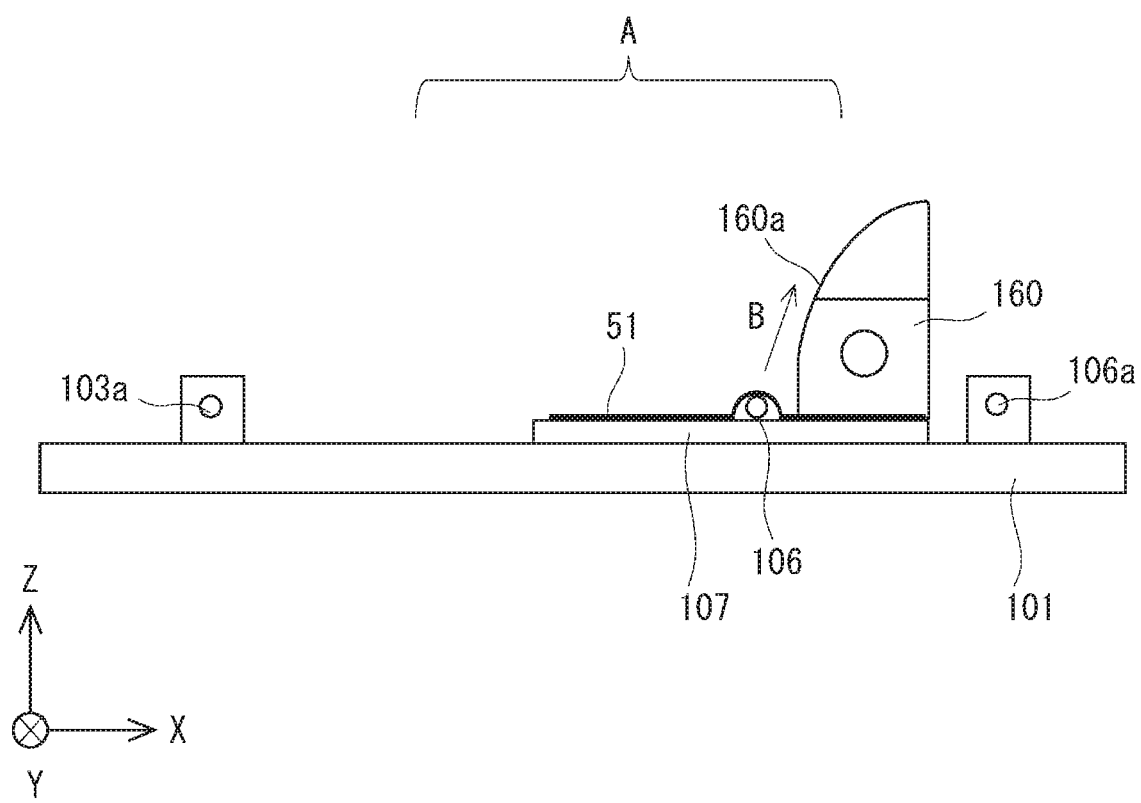
FIG. 8 is a sectional side view schematically illustrating a sheet-placed state.
Figure 9:
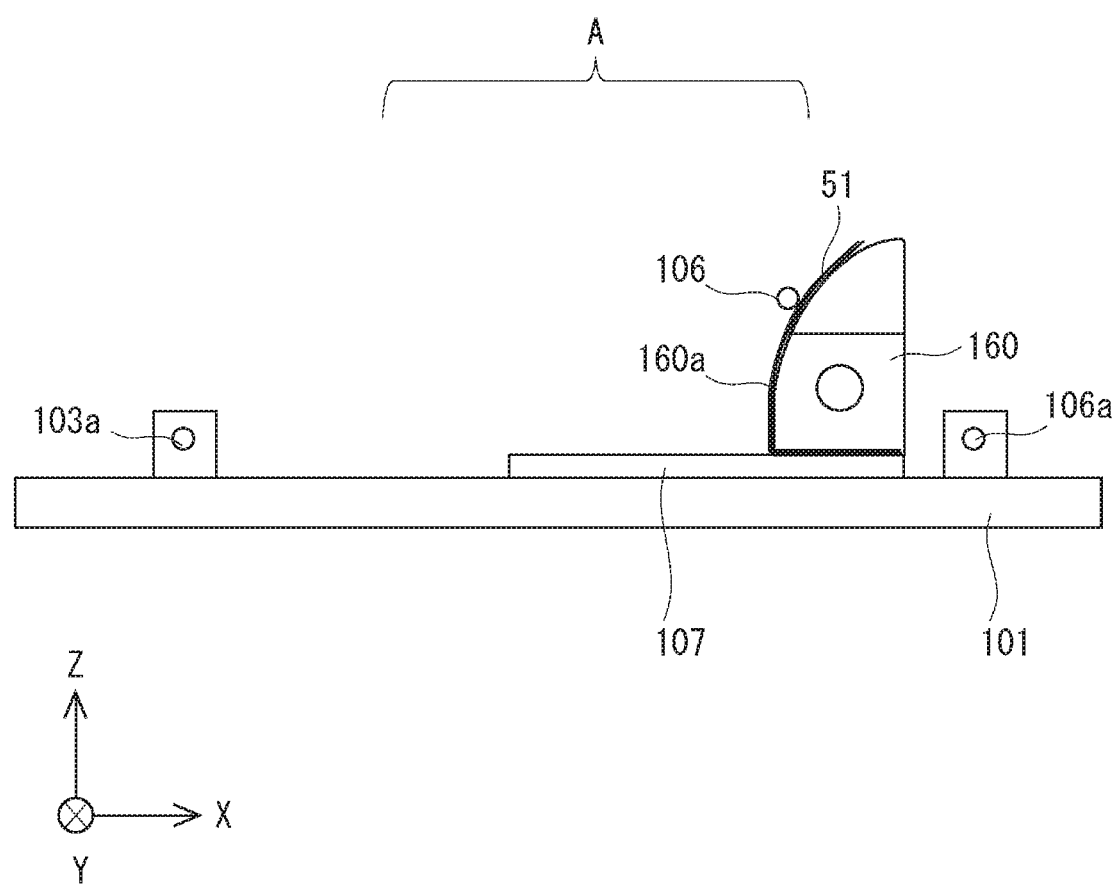
FIG. 9 is a sectional side view schematically illustrating a sheet-held state.

Next, description will be provided on holding operation with the sheet holding guide 106 to hold the sheets 50 along the sheet holding side face 160*a* with reference to FIGS. 8 and 9. FIG. 8 is a sectional side view schematically illustrating a state before the sheets 50 are held by the sheet holding guide 106 (hereinafter, called a sheet-placed state). That is, in the sheet-placed state, the layered body 51 is placed on the sheet-use pallet 107. FIG. 9 is a sectional side view schematically illustrating a state after the sheets 50 are held by the sheet holding portion 160 and the sheet holding guide 106 (hereinafter, called a sheet-held state). In FIGS. 8 and 9, the plurality of layered sheets 50 are illustrated as the layered body 51. In the states illustrated in FIGS. 8 and 9, the electrode holding portion 102 and the like are not attached to the stage 101.

As illustrated in FIG. 8, in the sheet-placed state, the layered body 51 is placed entirely on the sheet-use pallet 107. One end of the layered body 51 on +X side is placed between the sheet-use pallet 107 and the sheet holding portion 160. The sheet holding guide 106 is arranged below the layered body 51. That is, at the work space A, the sheet holding guide 106 is arranged between the sheet-use pallet 107 and the layered body 51. The layered body 51 is placed on the sheet-use pallet 107 over the sheet holding guide 106. Then, the sheet holding guide 106 is rotated about the rotational shaft 106*a*. In FIG. 8, the sheet holding guide 106 is rotated about the rotational shaft 106*a* that is oriented along Y direction. At the work space A, the sheet holding guide 106 is lifted in a direction of arrow B.

Thus, at the work space A, the sheet holding guide 106 is moved upward to be in the sheet-held state as illustrated in FIG. 9. In the sheet-placed state illustrated in FIG. 8, the sheet holding guide 106 is located below the layered body 51. Accordingly, when the sheet holding guide 106 is rotated in the direction of arrow B, the sheet holding guide 106 lifts the layered body 51. Then, the sheet holding guide 106 is moved into the vicinity of the sheet holding side face 160*a*. Thus, the layered body 51 is held along the sheet holding side face 160*a* of the sheet holding portion 160. That is, the layered body 51 is held between the sheet holding side face 160*a* and the sheet holding guide 106 along the sheet holding side face 160*a*.

The abovementioned operation of the sheet holding guide 106 performs switching between the sheet-placed state and the sheet-held state. That is, the layered body 51 is maintained in a state of being lifted from the sheet-use pallet 107 by rotating the sheet holding guide 106 about the rotational shaft 106*a*. In the sheet-held state, the layered body 51 is held along the sheet holding side face 160*a*. That is, the layered body 51 is nipped between the sheet holding side face 160*a* and the sheet holding guide 106. Thus, the sheet holding guide 106 lifts the layered body 51 placed at the work space A and holds the layered body 51 along the sheet holding side face 160*a*.

Description returns to FIGS. 5 to 7. The electrode-use pallet 104 is arranged between the stage 101 and the electrode holding portion 102. The electrode-use pallet 104 is a plate-shaped member on which an end of the electrodes 30 on −X side is placed (see FIG. 7). The tab portions 31 of the electrodes 30 (see FIGS. 1 and 2) are arranged on the electrode-use pallet 104. That is, the electrodes 30 are extended from the electrode holding portion 102 toward +X side. The electrode holding portion 102 is arranged on the electrodes 30. Thus, the electrodes 30 are nipped at one end thereof by the electrode-use pallet 104 and the electrode holding member 102.

The electrodes 30 are extended from above the electrode-use pallet 104 to above the sheet-use pallet 107. As illustrated in FIG. 7, a through-hole 104*a* is formed at the electrode-use pallet 104. A slide pin 101*a* is attached to the stage 101. Further, an elongated hole 101*b* is formed at the stage 101 along X direction. The slide pin 101*a* is inserted through the elongated hole 101*b* and the through hole 104*a*. Accordingly, owing to that the slide pin 101*a* is slidingly moved along the elongated hole 101*b*, the sheet-use pallet 107 is slidingly moved along X direction. Slide motion of the sheet-use pallet 107 will be described later.

As described above, the electrode holding portion 102 includes the electrode holding side face 102*a* facing the work space A. The electrodes 30*a* are held along the electrode holding side face 102*a*. The electrode holding side face 102*a* includes a groove 102*b* formed along Y direction. The electrode flipping rod 105 is to be inserted to the groove 102*b*. Accordingly, the electrode flipping rod 105 is inserted between the electrodes 30*a* and the electrode holding side face 102*a*.

The electrode holding guide 103 is attached to the stage 101 via a rotational shaft 103*a*. The electrode holding guide 103 is rotated about the rotational shaft 103*a*. The rotational shaft 103*a* is arranged on −X side of the electrode holding portion 102. The electrode holding guide 103 is extended from the rotational shaft 103*a* toward +X side of the electrode holding portion 102. A part of the electrode holding guide 103 is arranged on the electrode holding side face 102*a* side of the electrode holding portion 102. The electrode holding guide 103 is formed of rod-like metal or rod-like resin curved into a predetermined shape (U shape in FIGS. 5 and 6).

Owing to that the electrode holding guide 103 lifts the electrodes 30 placed on the work space A, the electrodes 30 are held along the electrode holding side face 102*a*. Since the electrode holding side face 102*a* is curved, the electrodes 30 are held as being curved as well.

Figure 10:
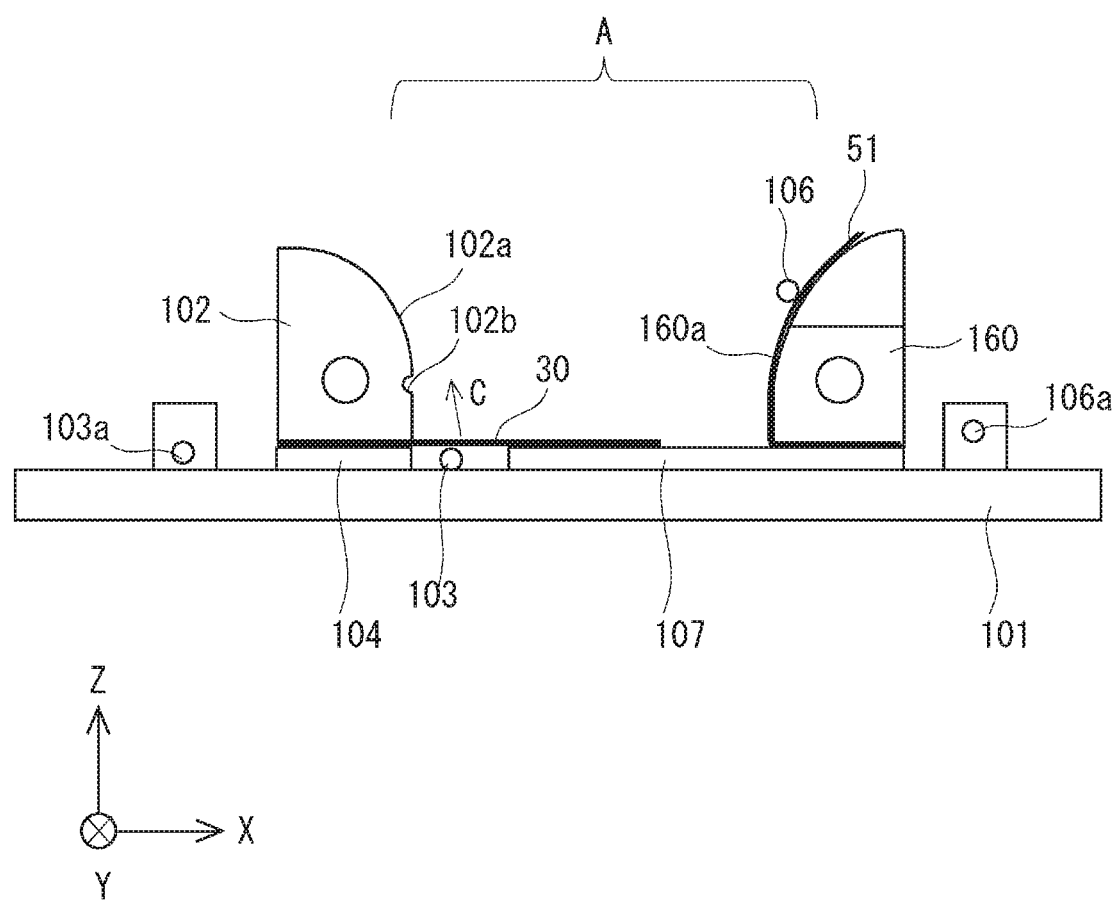
FIG. 10 is a sectional side view schematically illustrating an electrode-placed state.
Figure 11:
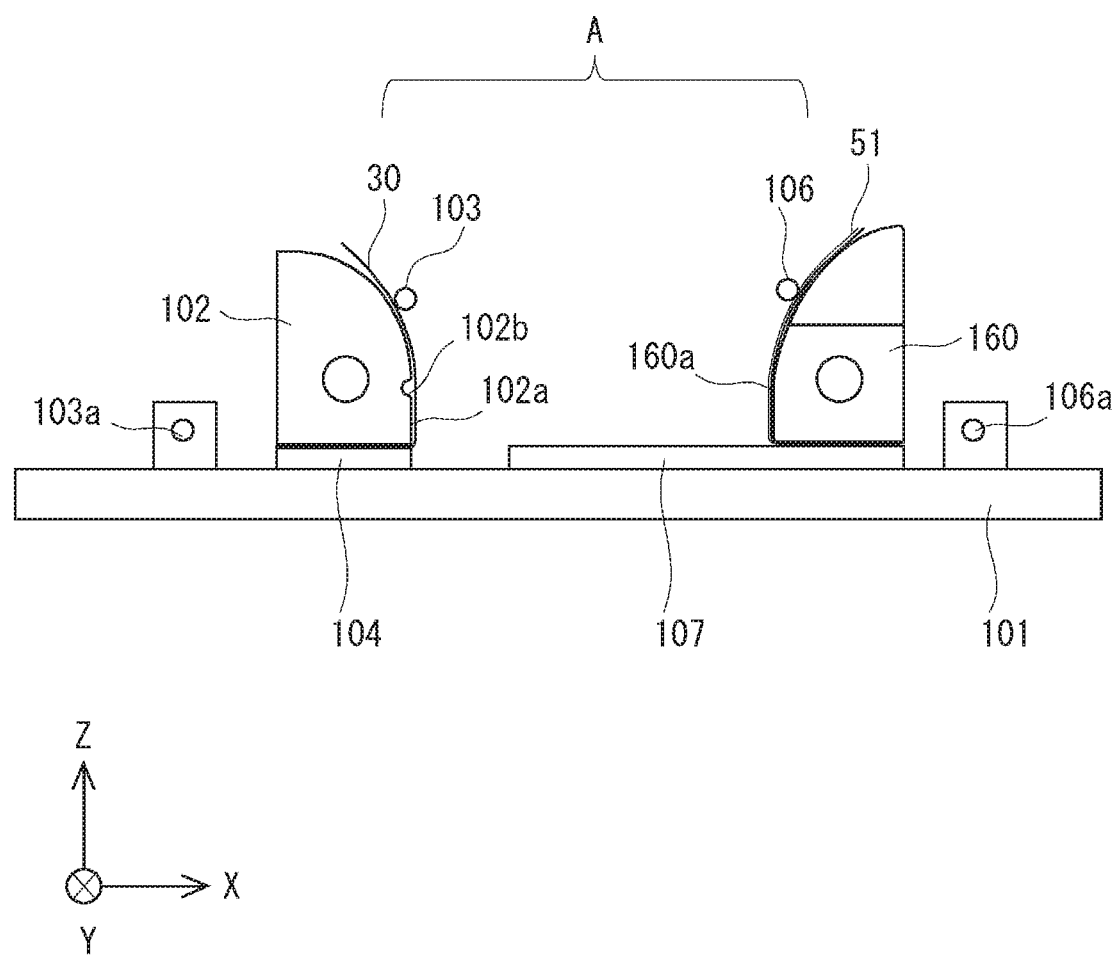
FIG. 11 is a sectional side view schematically illustrating an electrode-held state.

Next, description will be provided on holding operation with the electrode holding guide 103 to hold the electrodes 30 along the electrode holding side face 102*a* with reference to FIGS. 10 and 11. FIG. 10 is a sectional side view schematically illustrating a state before the electrodes 30 are held by the electrode holding guide 103 (hereinafter, called an electrode-placed state). FIG. 11 is a sectional side view schematically illustrating a state after the electrodes 30 are held by the electrode holding guide 103 (hereinafter, called an electrode-held state).

As illustrated in FIG. 10, in the electrode-placed state, one end (end on −X side) of the electrodes 30 is placed on the electrode-use pallet 104. The other end (end on +X side) of the electrodes 30 is placed on the sheet-use pallet 107. The electrode holding guide 103 is arranged below the electrodes 30. That is, at the work space A, the electrode holding guide 103 is arranged between the stage 101 and the electrodes 30. Then, the electrode holding guide 103 is rotated about the rotational shaft 103*a*. In FIG. 10, the electrode holding guide 103 is rotated about the rotational shaft 103*a* that is oriented along Y direction. At the work space A, the electrode holding guide 103 is lifted in a direction of arrow C.

Thus, at the work space A, the electrode holding guide 103 is moved upward to be in the electrode-held state as illustrated in FIG. 11. In the electrode-placed state illustrated in FIG. 10, the electrode holding guide 103 is located below the electrodes 30 at the work space A. Accordingly, when the electrode holding guide 103 is rotated in the direction of arrow C, the electrode holding guide 103 lifts the electrodes 30. Then, the electrode holding guide 103 is moved into the vicinity of the electrode holding side face 102*a*. Thus, the electrodes 30 are held along the electrode holding side face 102*a* of the electrode holding portion 102. That is, the electrodes 30 are held between the electrode holding portion 102 and the electrode holding guide 103 along the electrode holding side face 102*a*.

The abovementioned rotational operation of the electrode holding guide 103 performs switching between the electrode-placed state and the electrode-held state. That is, the electrodes 30 are maintained in a state of being lifted from the sheet-use pallet 107 by rotating the electrode holding guide 103 about the rotational shaft 103*a*. In the electrode-held state, the electrodes 30 are held along the electrode holding side face 102*a*. That is, the electrodes 30 are nipped between the electrode holding side face 102*a* and the electrode holding guide 103.

FIG. 11 illustrates both the sheet-held state and the electrode-held state. That is, in FIG. 11, the electrodes 30 are lifted by the electrode holding guide 103 and the layered body 51 is lifted by the sheet holding guide 106. From the above state, the sheet 50 and the electrode 30 are flipped alternately. That is, a process of flipping one sheet 50 and a process of flipping one electrode 30 are alternately repeated. Thus, the sheet-shaped secondary cell 500 illustrated in FIGS. 1 and 2 is manufactured.

The sheet layering jig 100 includes the electrode flipping rod 105 and the tweezers 108. The tweezers 108 serve as an example of a sheet grasping member arranged for grasping one sheet 50. As illustrated in FIG. 6, the tweezers 108 grasp an end of the sheet 50*a* held by the sheet holding portion 160. Owing to that the tweezers 108 grasping the end of the sheet 50 is moved toward the work space A, one sheet 50*a* can be flipped. Specifically, as indicated by arrow D in FIG. 12, owing to that one sheet 50*a* is drawn below the sheet holding guide 106 using the tweezers 108, holding of the sheet 50 by the sheet holding portion 160 and the sheet holding guide 106 is released. Thus, the one sheet 50 is flipped onto the sheet-use pallet 107. As described above, owing to that one sheet 50 is separated from the layered body 51 held by the sheet holding portion 160, the sheets 50 are placed one by one on the sheet-use pallet 107 at the work space A.

The electrode flipping rod 105 is inserted to the groove 102*b*. In FIG. 11, since the groove 102*b* is formed along Y direction, the insertion direction of the electrode flipping rod 105 is oriented in Y direction. As illustrated in FIG. 5, the electrode flipping rod 105 is inserted between the electrodes 30*a* and the electrode holding portion 102. The electrode flipping rod 105 is operated to be apart from the electrode holding side face 102*a*. Specifically, as indicated by arrow E in FIG. 13, owing to that one electrode 30 is drawn below the electrode holding guide 103 using the electrode flipping rod 105, the electrode 30 is flipped onto the sheet-use pallet 107. Thus, holding of the electrode 30 by the electrode holding portion 102 and the electrode holding guide 103 is released. Accordingly, the electrode 30 is placed on the sheet 50 placed on the sheet-use pallet 107.

Here, the groove 102*b* to which the electrode flipping rod 105 is inserted is formed along Y direction. Further, the electrodes 30 are arranged as being shifted in Y direction as illustrated in FIG. 5. Accordingly, the electrode flipping rod 105 can flip the electrodes 30 one by one. That is, owing to that the insertion position of the electrode flipping rod 105 is caused to proceed in Y direction, the electrode flipping rod 105 can flip the electrodes 30 one by one from −Y side. Specifically, first, the electrode flipping rod 105 is inserted to a position of the first electrode 30 from −Y side and releases holding of the first electrode 30. Subsequently, the electrode flipping rod 105 is inserted to a position of the second electrode 30 from −Y side and releases holding of the second electrode 30. Thus, owing to that the electrode flipping rod 105 is inserted to the groove 102b further step by step, holding of the electrodes 30 can be released one by one sequentially from −Y side.

Figure 12:
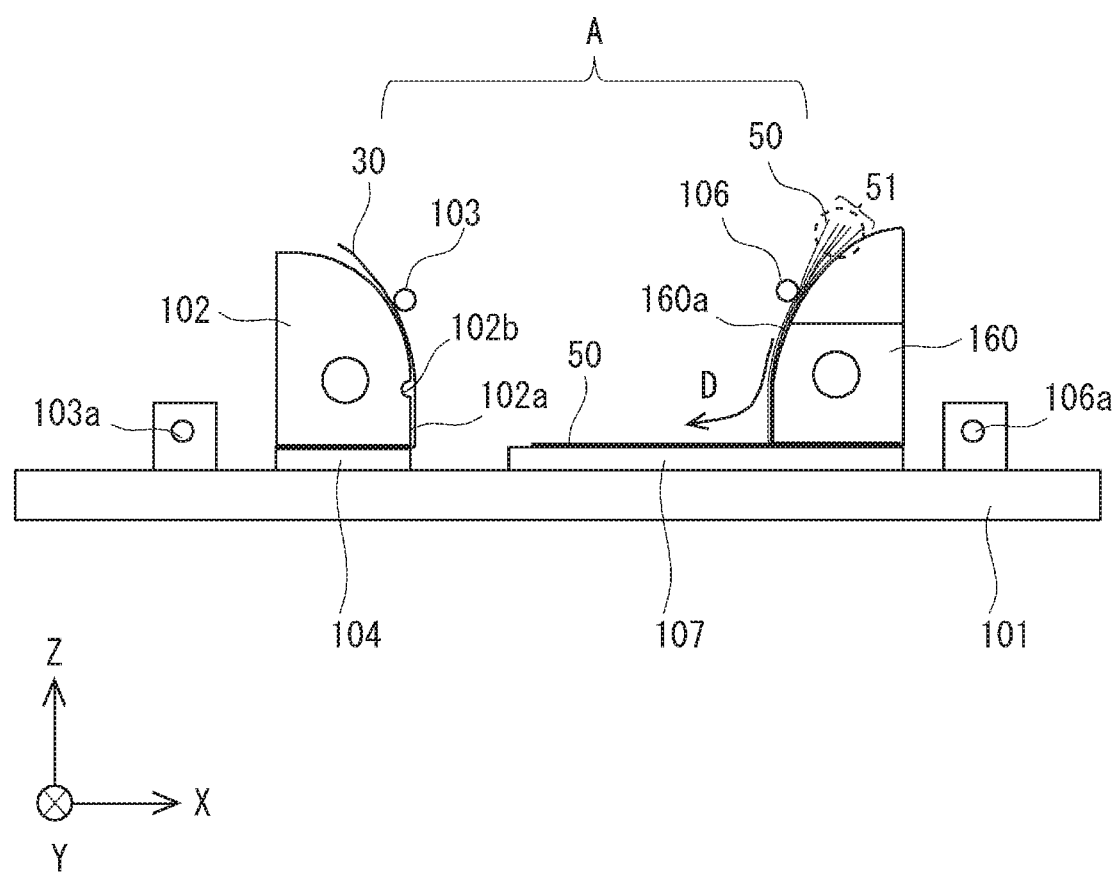
FIG. 12 is a sectional side view schematically illustrating a state that a single sheet is flipped from a sheet-held state.

As described above, owing to that the sheet 50 and the electrode 30 are placed alternately at the work space A, the sheet-shaped secondary cell 500 illustrated in FIGS. 1 and 2 is manufactured. Here, in a case that one sheet 50 is flipped from the layered body 51 in the sheet-held state, first, the sheet 50 is separated from the layered body 51 as illustrated in FIG. 12 using the magnetic circuit 20. Thus, gaps between the sheets 50 are enlarged above the sheet holding guide 106 (see dotted-line circle in FIG. 12).

Figure 14:
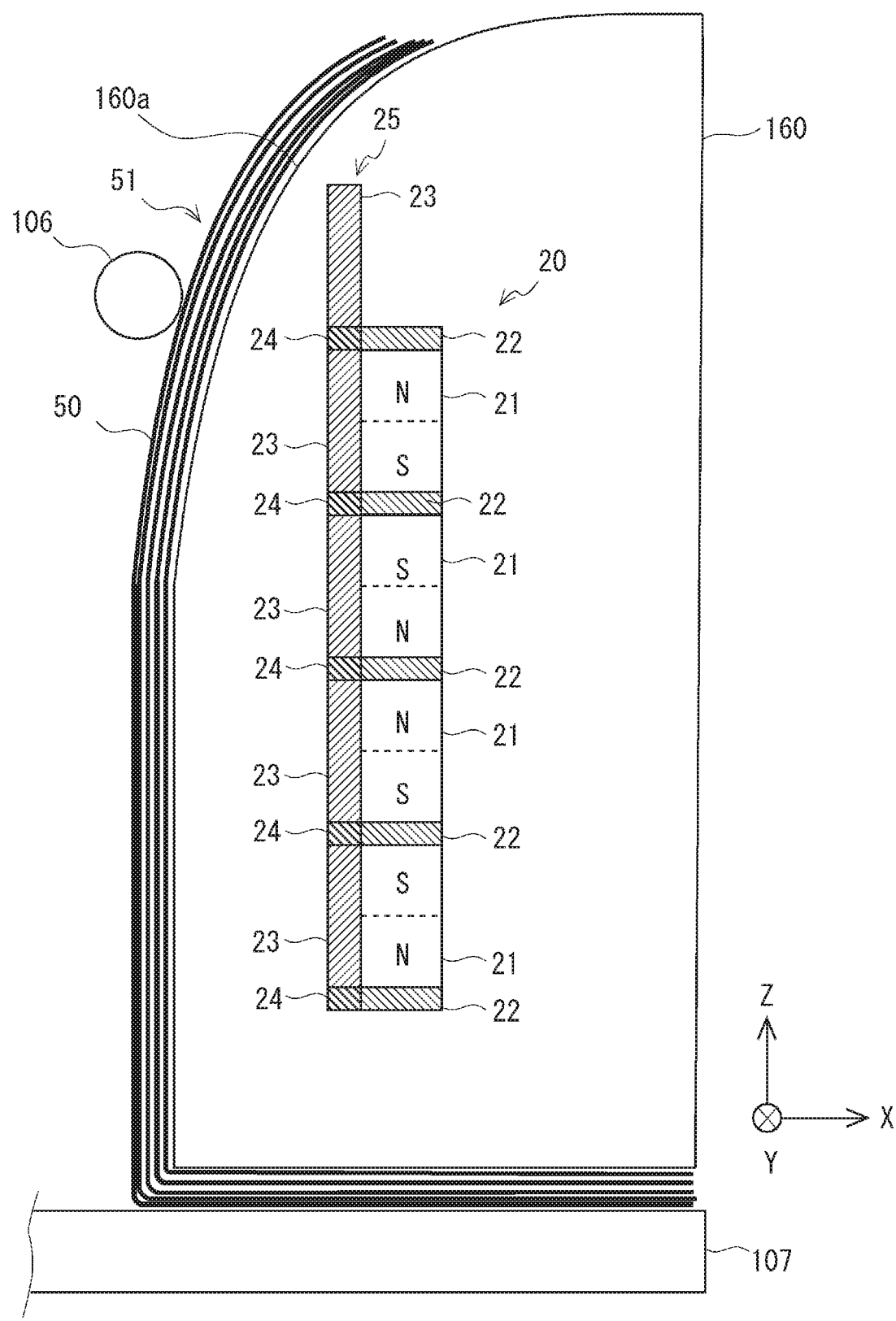
FIG. 14 is a side view schematically illustrating a structure of a magnetic circuit arranged in a sheet holding portion.
Figure 15:
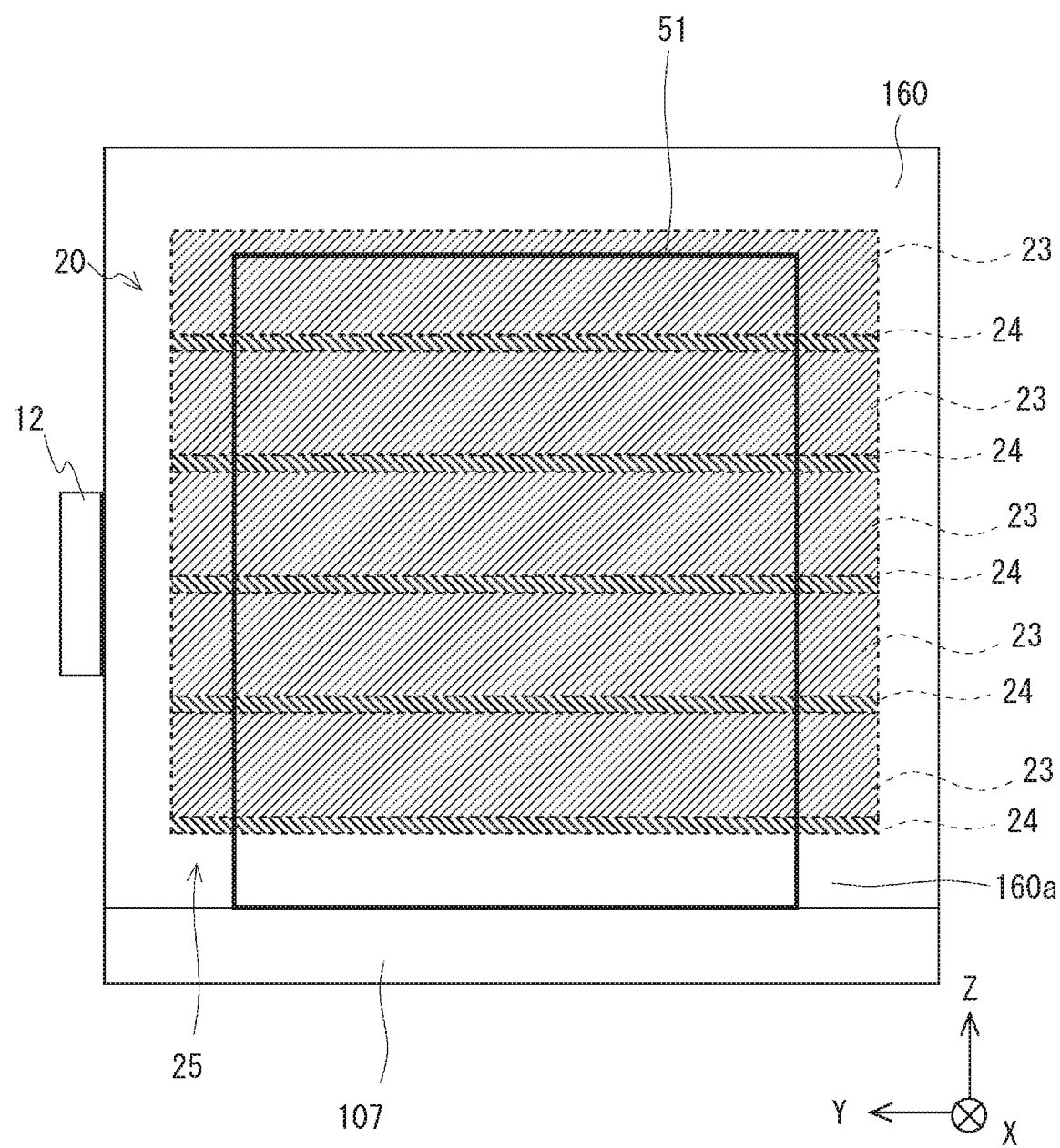
FIG. 15 is a view schematically illustrating the magnetic circuit viewing from a work space side.

The sheet holding portion 160 includes the magnetic circuit 20 for separating one sheet 50 from the layered body 51. The sheet holding portion 160 separates the sheets 50 one by one from the layered body 51 using magnetic force of the magnetic circuit 20. In the following, description will be provided on the magnetic circuit 20 arranged in the sheet holding portion 160 with reference to FIGS. 14 and 15. FIG. 14 is a side view schematically illustrating a structure of the sheet holding portion 160 and the magnetic circuit 20. FIG. 15 is a plane view schematically illustrating the structure of the sheet holding portion 160 and the magnetic circuit 20 as viewing from the work space A side.

Figure 13:
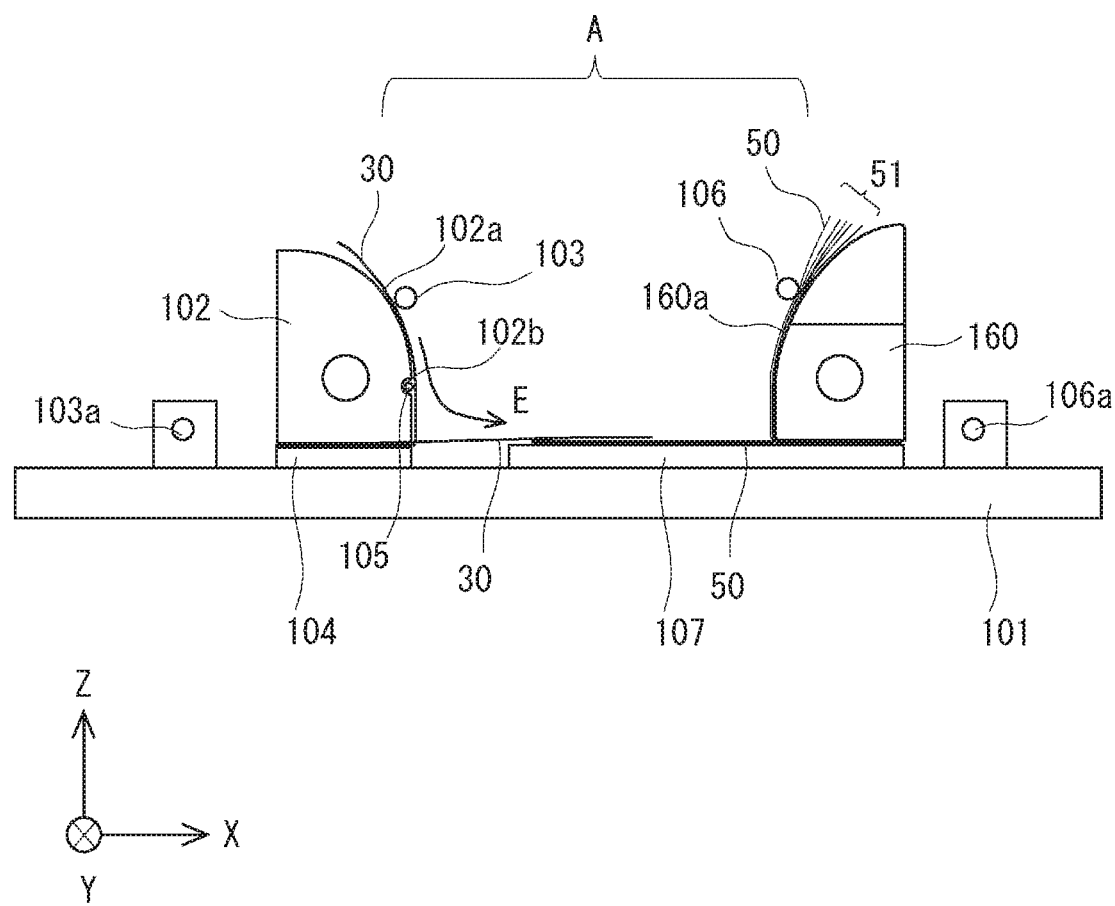
FIG. 13 is a sectional side view schematically illustrating a state that a single electrode is flipped from an electrode-held state.

In the following description, a non-separated state represents a state of the layered body 51 before the sheets 50 are separated as in FIGS. 9, 10, 11, and 14 and a separated state represents a state of the layered body 51 after the sheets 50 are separated as in FIGS. 12, 13, and 16.

The sheet holding portion 160 includes a lever 12 (see FIG. 15) and the magnetic circuit 20. As illustrated in FIG. 2, the lever 12 is arranged at the sheet holding portion 160 on a side face thereof along the XZ plane on +Y side. The lever 12 is arranged to slidingly move a slide portion 25 of the magnetic circuit 20 along Z direction.

The magnetic circuit 20 is housed in the sheet holding portion 160. The magnetic circuit 20 includes permanent magnets 21, first yokes 22, and the slide portion 25. The slide portion 25 includes second yokes 23 and nonmagnetic members 24.

The magnetic circuit 20 includes a plurality of the permanent magnets 21. The permanent magnets 21 are arranged on the sheet holding side face 160a in line in a first direction. In FIGS. 14 and 15, Z direction is set as the first direction, so that the permanent magnets 21 are arranged in Z direction. Here, the first direction is not limited to Z direction. A direction along the sheet holding side face 160a may be set as the first direction. Here, the direction along the sheet holding side face 160a includes, in addition to Z direction, a direction inclined from Z direction to +Y side or to −Y side.

The permanent magnets 21 are arranged in a state that the same poles of the adjacent magnets are faced to each other. In the example illustrated in FIG. 14, regarding the first and third permanent magnets 21 from the bottom, S poles are arranged at +Z side and N poles are arranged at −Z side. Meanwhile, regarding the first and third permanent magnets 21 from the top, N poles are arranged at +Z side and S poles are arranged at −Z side.

According to such arrangement, the S poles are faced to each other in the permanent magnets 21 being at the first and second from the top, N poles are faced to each other in the permanent magnets 21 being at the second and third from the top, and S poles are faced to each other in the permanent magnets 21 being at the third and fourth from the top.

Bar magnets as illustrated in FIG. 14 may be used as the permanent magnets 21 to actualize such arrangement. However, the permanent magnets 21 are not limited to bar magnets. Further, although FIG. 14 illustrates an example that four permanent magnets 21 are arranged in line, the number of the permanent magnets 21 is not specifically limited. Here, magnetic force of the permanent magnet 21 being the first from the top is set the largest and magnetic force of the permanent magnets 21 being the second to fourth from the top is set smaller than that of the permanent magnet 21 being the first from the top.

The first yokes 22 are arranged at both ends of each of the permanent magnets 21. That is, the permanent magnet 21 and the first yoke 22 are arranged alternately in Z direction. In FIG. 14, five first yokes 22 are arranged along Z direction. The first yokes 22 control orientation of magnetic lines from the permanent magnets 21.

The slide portion 25 is arranged on −X side of the permanent magnets 21. That is, the slide portion 25 is arranged between the layered body 51 and the permanent magnets 21 in X direction. The slide portion 25 includes the second yokes 23 and the nonmagnetic members 24. The second yokes 23 control flow of magnetic lines from the permanent magnets 21. The magnetic lines from the permanent magnets 21 cannot pass through the nonmagnetic members 24.

The nonmagnetic members 24 are arranged at positions corresponding to the first yokes 22. The second yokes 23 are arranged at positions corresponding to the permanent magnets 21. The nonmagnetic member 24 and the second yoke 23 are arranged alternately in Z direction. The slide portion 25 of the example illustrated in FIG. 14 includes five second yokes 23 and five nonmagnetic members 24.

The permanent magnets 21 and the second yokes 23 have approximately the same length in Z direction. Each permanent magnet 21 and corresponding second yokes 23 are located at the same position in Z direction. Further, the first yokes 22 and the nonmagnetic members 24 have approximately the same length in Z direction. Each first yoke 22 and corresponding nonmagnetic member 24 are located at the same position in Z direction.

According to such arrangement of the permanent magnets 21, the first yokes 22, the second yokes 23, and the nonmagnetic members 24, magnetic force from the permanent magnets 21 through the first yokes 22 can be prevented from reaching the second yokes 23 and magnetic force from the permanent magnets 21 through the second yokes 23 can be prevented from reaching the first yokes 22. Such arrangement of the slide portion 25 as illustrated in FIG. 14 is called an initial state in the following description.

The second yokes 23 are arranged between the layered body 51 and the permanent magnets 21 in X direction. The nonmagnetic members 24 are arranged between the layered body 51 and the first yokes 22 in X direction.

Figure 16:
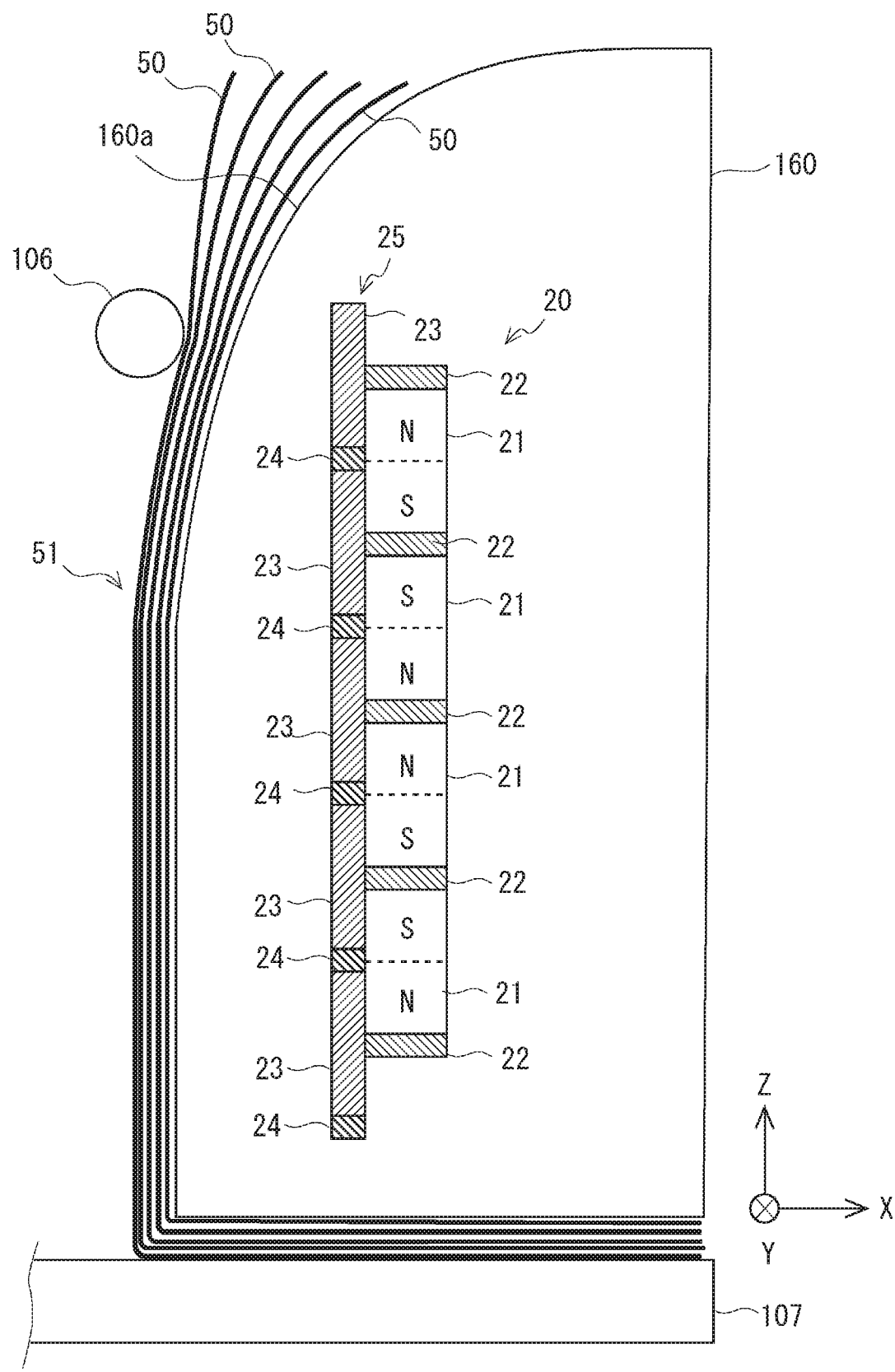
FIG. 16 is a side view schematically illustrating a structure of the sheet holding portion in a separated state.

FIG. 16 is a side sectional view schematically illustrating a structure in a separated state. The slide portion 25 is arranged movably in Z direction with respect to the sheet holding portion 160. That is, the slide portion 25 slides in Z direction (first direction) in the sheet holding portion 160. Specifically, operating the lever 12 causes the slide portion 25 to slide along Z direction. FIG. 16 illustrates a state that the slide portion 25 has slid. Such arrangement of the slide portion 25 as illustrated in FIG. 16 is called a slid state in the following description.

When the lever 12 is operated, the slide portion 25 is moved in −Z direction from the state illustrated in FIG. 14. That is, the slide portion 25 is shifted from the initial state to the slid state, thereby the layered body 51 is shifted from the non-separated state illustrated in FIG. 14 to the separated state illustrated in FIG. 16.

In Z direction, relative positions of the second yokes 23 are varied with respect to the permanent magnets 21 and the first yokes 22 and relative positions of the nonmagnetic members 24 are varied with respect to the permanent magnets 21 and the first yokes 22. From the initial state to the slid state, the slide portion 25 is moved by the amount of about a half of total length of the permanent magnet 21 and the first yoke 22 in Z direction. Accordingly, the nonmagnetic members 24 are moved to positions corresponding to the permanent magnets 21. More specifically, the nonmagnetic members 24 are moved onto positions corresponding to the permanent magnets 21. In other words, each nonmagnetic member 24 is moved onto a center position between an N pole and an S pole of the corresponding permanent magnet 21 in Z direction (as indicated by dotted lines in FIG. 16). The nonmagnetic members 24 are located at the center positions of the permanent magnets 21 in Z direction.

Further, the second yokes 23 are moved to positions corresponding to the first yokes 22. The length of the second yoke 23 in Z direction is larger than that of the first yoke 22. Accordingly, the second yoke 23 is extended from a position corresponding to the first yoke 22 to a position corresponding to the permanent magnet 21. Here, each second yoke 23 is not extended between positions corresponding to both poles of the permanent magnet 21. For example, the second yoke 23 being at the second from the bottom is located at positions corresponding to the first yoke 22 and only S poles of the corresponding permanent magnets 21. The second yoke 23 being at the third from the bottom is located at positions corresponding to the first yoke 22 and only N poles of the permanent magnets 21. Thus, each second yoke 23 is extended from a position corresponding to the first yoke 22 to a position corresponding to one pole of the permanent magnet 21. Accordingly, magnetic force of the permanent magnets 21 arranged at both sides of the first yoke 22 is concentrated on the first yoke 22, and further, the concentrated magnetic force is concentrated on the second yoke 23 in contact with the first yoke 22.

Figure 17:
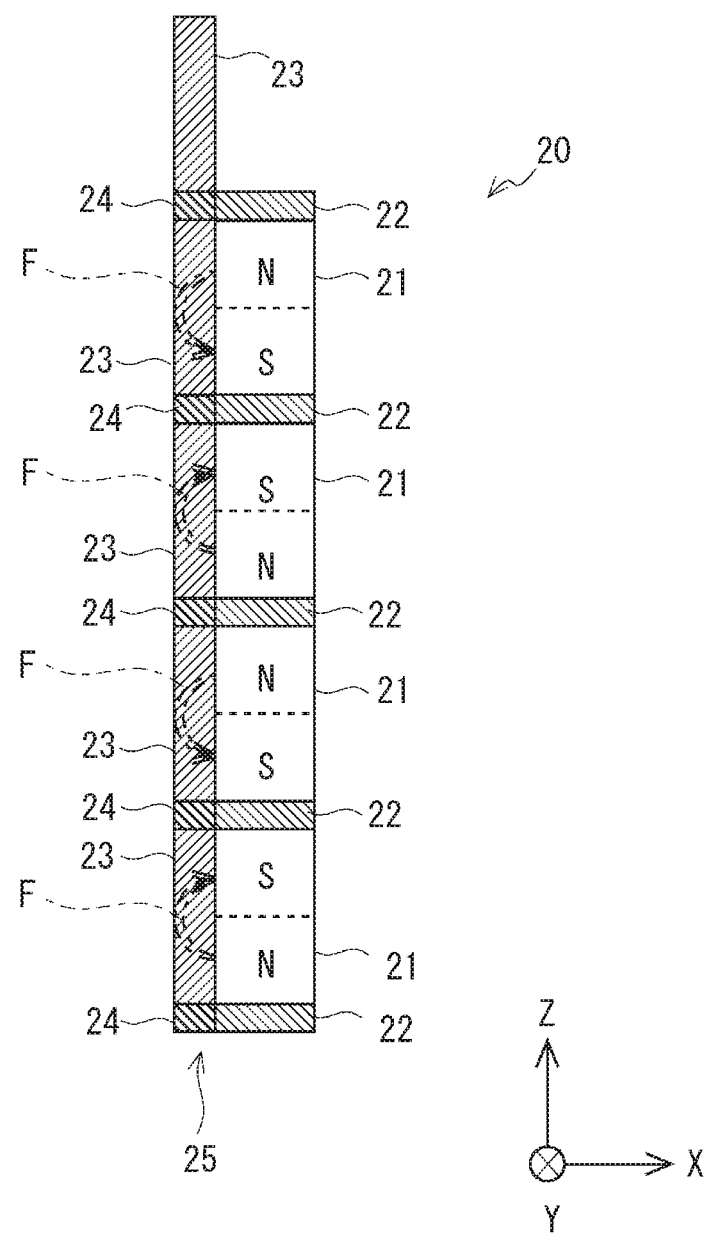
FIG. 17 is a view illustrating magnetic lines generated by the magnetic circuit in a non-separated state.
Figure 18:
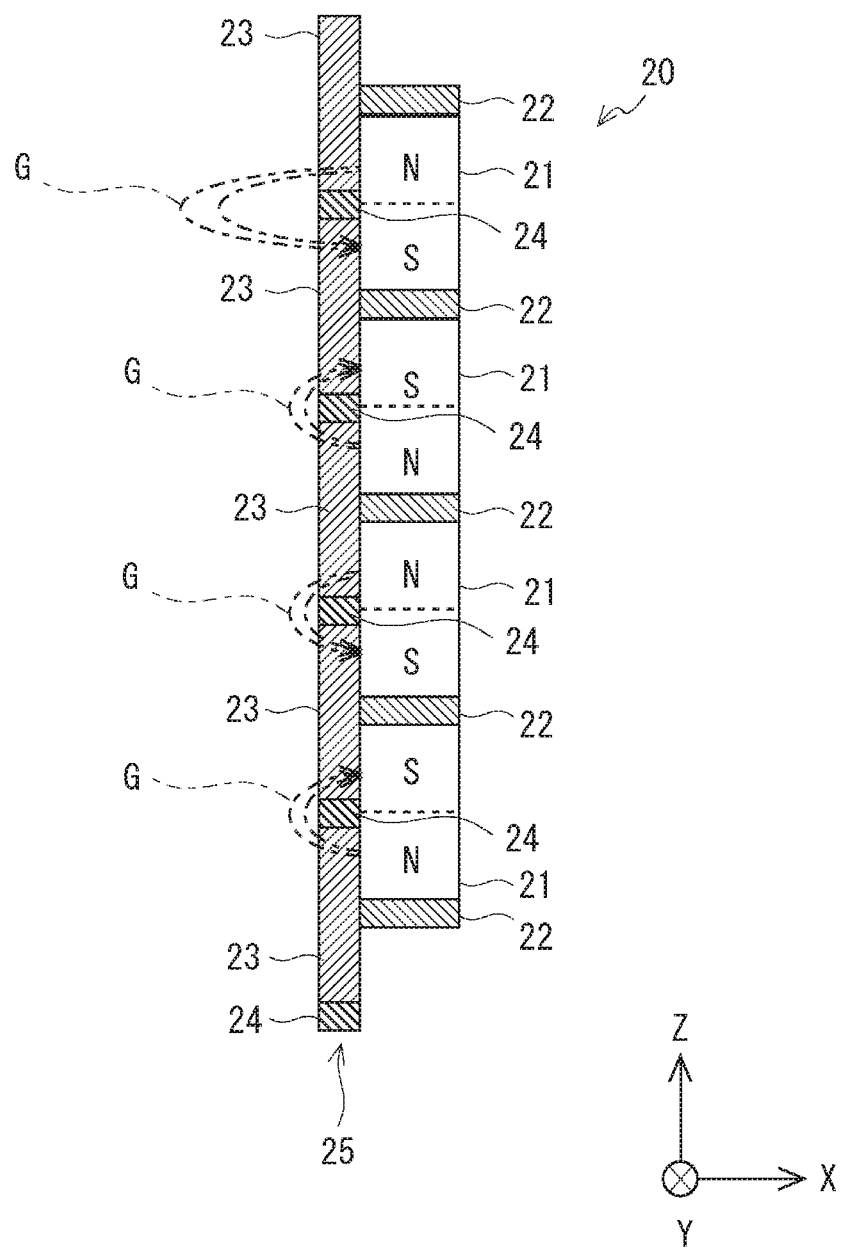
FIG. 18 is a view illustrating magnetic lines generated by the magnetic circuit in the separated state.

Owing to that magnetic force generated by the magnetic circuit 20 is concentrated in a specific direction as described above, magnetic lines are strengthened in X direction and reach the layered body 51 through a face of the second yoke 23. Accordingly, the layered body 51 can be bent by magnetic force of the magnetic circuit 20. In the following, description will be provided on magnetic lines generated by the magnetic circuit 20 with reference to FIGS. 17 and 18. FIG. 17 is a side view illustrating a structure in the non-separated state and FIG. 18 is a side view illustrating a structure in the separated state. That is, FIG. 17 illustrates magnetic lines F in the non-separated state of FIG. 14 and FIG. 18 illustrates magnetic lines G in the separated state of FIG. 16.

In FIG. 17, one second yoke 23 is placed at a region corresponding to an N pole and an S pole of one permanent magnet 21. Accordingly, the magnetic lines F from the permanent magnets 21 pass through the inside of the second yokes 23. That is, the magnetic lines F exiting from the N poles of the permanent magnets 21 return to the S poles of the permanent magnets 21 through the inside of the second yokes 23. Therefore, magnetic force does not occur on −X side of the slide portion 25, so that magnetic force is not exerted on the layered body 51.

In contrast, in FIG. 18, one second yoke 23 is placed at a region corresponding to the same poles of the two permanent magnets 21. For example, the second yoke 23 being at the third from the bottom is arranged at a region corresponding to the N pole of the permanent magnet 21 being at the second from the bottom through the N pole of the permanent magnet 21 being at the third from the bottom. The nonmagnetic member 24 is arranged between the adjacent two second yokes 23. The magnetic lines G do not pass through the inside of the nonmagnetic member 24. The magnetic lines G exiting from the N poles of the permanent magnets 21 pass through faces of the second yokes 23 and return to the S poles of the permanent magnets 21 after passing a space on −X side of the nonmagnetic members 24. Trajectories of the magnetic lines G are parabola-shaped. Accordingly, magnetic lines G reach the layered body 51 from above the slide portion 25, so that magnetic force is exerted on the layered body 51.

In the magnetic circuit 20, three or more of the permanent magnets 21 are arranged in line in Z direction. Here, magnetic force of the permanent magnets 21 placed at the center region and lower end region of the sheet holding side face 160*a* in Z direction is set smaller than that of the permanent magnet 21 placed at the upper end region of the sheet holding side face 160*a*.

Owing to that magnetic force is appropriately generated by three or more permanent magnets 21, magnetic force to be exerted on the upper end region of the sheets 50 is larger than magnetic force to be exerted on the center region and lower end region of the sheets 50. Accordingly, the sheets 50 can be appropriately bent. According to the above, since gaps between the sheets 50 can be enlarged at the upper ends of the sheets 50, the sheet 50 can be easily separated from the layered body 51.

In the slid state (separated state) illustrated in FIGS. 16 and 18, magnetic force is exerted on the layered body 51. Accordingly, as illustrated in FIG. 16, bend of the layered body 51 becomes large, so that the layered body 51 is to be apart from the sheet holding side face 160*a*. Here, the sheets 50 have different curvature, respectively. The sheet 50 being at the first from −X side has the largest curvature. The sheet 50 on +X side has smaller curvature. Accordingly, gaps are generated between the sheets 50 at the ends of the layered body 51 to be in the separated state in which a sheet 50 is separated from the layered body 51.

In the separated state, the sheets 50 can be separated one by one from the layered body 51. That is, for flipping a sheet 50 with tweezers 108, it is prevented to flip two or more sheets 50 at the same time. It becomes easier to hold an end of a sheet 50 with tweezers 108 or the like. According to the magnetic circuit 20 of the sheet holding portion 160, a single sheet 50 can be easily separated from the layered body 51. Thus, the sheets 50 can be easily flipped one by one from the layered body 51.

Curvature of the sheets 50 can be adjusted by changing magnitude of the magnetic force and the like, especially, of the uppermost permanent magnet 21 (i.e., the permanent magnet 21 placed at the upper end region of the sheet holding side face 160*a*). It is also possible to adjust magnetic force by adjusting sizes and the like of the first yokes 22 and the second yokes 23. Further, it is also possible to adjust curvature of the sheets 50 by a slide amount of the slide portion 25. Here, it is preferable that the process is performed under conditions of time and magnetic force not to cause the sheets 50 to be magnetized. Although strength of magnetic lines varies with the kind of permanent magnets such as ferrite and neodymium, any kind of magnets can be used in principle.

Next, description will be provided on effects of the sheet layering jig 100 of the present embodiment. As described above, the sheet holding portion 160 and the electrode holding portion 102 are arranged on the stage 101 as facing each other. That is, since the present embodiment does not require a conveying device for sucking and conveying sheets 50, a holding mechanism for holding sheets 50, and the like, downsizing can be performed as a whole. In other words, the installation space can be lessened in the present embodiment.

A layered product in which the electrodes 30 are inserted between the sheets 50 is manufactured by alternately flipping the sheet 50 and the electrode 30 to the work space A from the sheet holding portion 160 and the electrode holding portion 102, respectively. According to the above, a mechanism for picking and placing sheets 50 is not required. Accordingly, manufacturing can be performed with less part count. Thus, a layered product can be manufactured easily.

In the present embodiment, a single sheet 50 is separated from the layered body 51 using the magnetic circuit 20. According to the above, since a single sheet 50 can be easily grasped from the uppermost face of the layered body 51 using the tweezers 108, the sheets 50 can be easily flipped toward the work space A.

In the present embodiment, the plurality of sheets 50 can be conveyed collectively as being layered as the layered body 51. Accordingly, since it is not required to perform picking-placing operation for each sheet 50, productivity can be improved. Thus, it is possible to easily manufacture a layered product in which components are placed between layered sheets. Further, since the plurality of electrodes 30 can be conveyed collectively, productivity can be further improved.

Here, ends of the sheets 50 are nipped between the sheet-use pallet 107 and the sheet holding portion 160. Further, ends of the electrodes 30 are nipped between the electrode-use pallet 104 and the electrode holding portion 102. Accordingly, for alternately flipping the sheets 50 and the electrodes 30 toward the work space A, layering can be performed while preventing positional displacement of the sheets 50 and the electrodes 30. Here, it is also possible to prevent positional displacement by joining ends of the layered sheets 50 with welding.

Figure 19:
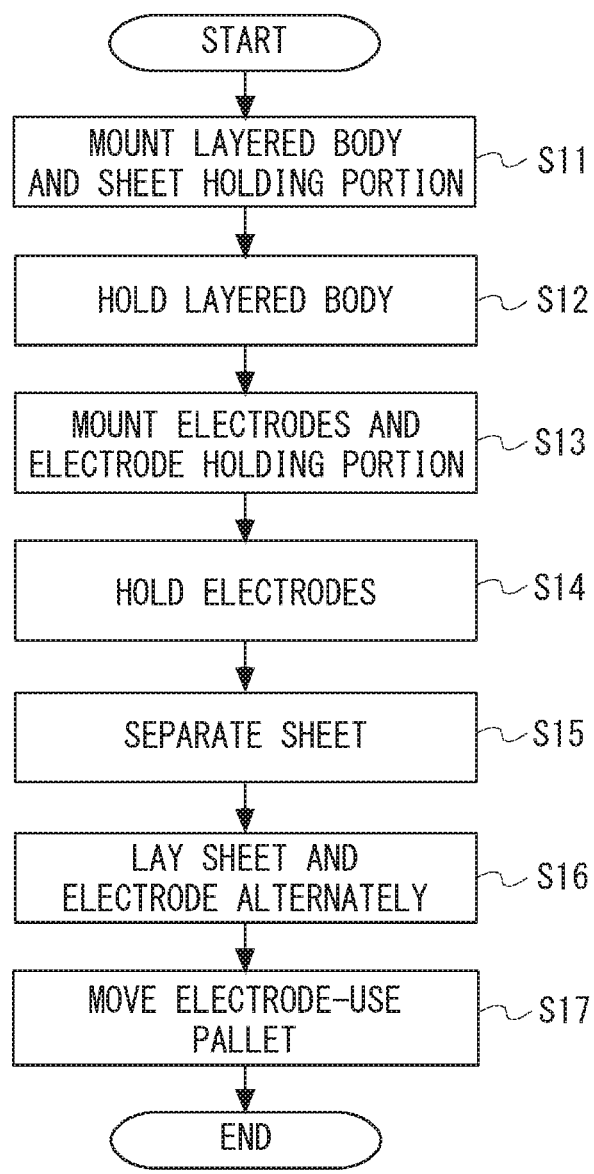
FIG. 19 is a flowchart showing a method for manufacturing a layered product.

Next, description will be provided on a method for manufacturing the sheet-shaped secondary cell 500 being a layered product using the sheet layering jig 100 of the present embodiment with reference to FIG. 19. FIG. 19 is a flowchart showing a method for manufacturing a layered product.

First, the layered body 51 and the sheet holding portion 160 are mounted on the stage 101 (step S11). That is, as illustrated in FIG. 8, the sheet-use pallet 107 on which the layered body 51 is placed and the sheet holding portion 160 are fixed onto the stage 101. Here, the sheet-use pallet 107 is attached to the stage 101 to be contacted to the positioning blocks 109. Thus, the layered body 51 is placed at the work space A as being in the sheet-placed state.

Then, the layered body 51 is held by the sheet holding portion 160 using the sheet holding guide 106 (step S12). That is, as indicated by arrow B in FIG. 8, the layered body 51 placed at the work space A is lifted by the sheet holding guide 106. Thus, as illustrated in FIG. 9, the layered body 51 is held along the sheet holding side face 160*a* as being in the sheet-held state.

Subsequently, the electrodes 30 and the electrode holding portion 102 are mounted on the stage 101 (step S13). That is, as illustrated in FIG. 10, the electrode-use pallet 104 on which the electrodes 30 are placed and the electrode holding portion 102 are fixed onto the stage 101. Thus, the electrodes 30 are placed at the work space A as being in the electrode-placed state. Here, as described above, the slide pin 101*a* illustrated in FIG. 7 is inserted to the through-hole 104*a* of the electrode-use pallet 104.

Then, the electrodes 30 are held by the electrode holding portion 102 using the electrode holding guide 103 (step S14). That is, as indicated by arrow C in FIG. 10, the electrodes 30 placed at the work space A are lifted by the electrode holding guide 103. Thus, as illustrated in FIG. 11, the electrodes 30 are held along the electrode holding side face 102*a* as being in the electrode-held state.

Next, a single sheet 50 is separated from the sheets 50 held between the sheet holding portion 160 and the sheet holding guide 106 (step S15). That is, owing to that the lever 12 is rotated by a user or a motor, the slide portion 25 is moved from the initial state into the slid state. Accordingly, the sheets 50 are turned into the separated state from the non-separated state.

In the separated state, each nonmagnetic member 24 is located at a position corresponding to a position between poles of the permanent magnet 21 and each second yoke 23 is located at a position corresponding to the first yoke 22. Magnetic force generated by the magnetic circuit 20 is exerted on the layered body 51. Accordingly, gaps are generated between the sheets 50 at the ends of the layered body 51. Thus, the sheets 50 can be easily separated one by one from the layered body 51. Here, the layered sheets 50 are in a curved state as illustrated in FIGS. 12 and 16.

In specific sense, the non-separated state represents a state that gaps between the sheets 50 are narrowed with the sheets 50 of the layered body 51 being approximately in parallel to one another. Further, the separated state represents a state that gaps between the sheets 50 are widened with the sheets 50 of the layered body 51 bent at different angles respectively with magnetic force of the magnetic circuit 20. When the layered body 51 is in the separated state, the sheets 50 can be easily separated one by one from the layered body 51.

Here, the order of steps S11 to S15 is not specifically limited. For example, steps S11 and S12 may be performed after performing steps S13 and S14. Further, the process to separate the sheets 50 in step S15 may be performed before the process of holding the electrodes 30 (step S13) as long as being after holding the layered body 51.

Next, the sheets 50 and the electrodes 30 are flipped alternately (step S16). That is, after a single sheet 50 is flipped toward the work space A in a state that gaps are generated between the sheets 50, a single electrode 30 is flipped onto the sheet 50. Specifically, a single sheet 50 and a single electrode 30 are flipped toward the work space A using the tweezers 108 and the electrode flipping rod 105, respectively. For flipping a single sheet 50, the sheet 50 is flipped in a direction of arrow D in FIG. 12. Accordingly, the single sheet 50 can be easily separated from the layered body 51. For flipping a single electrode 30, the single electrode 30 is flipped out of the electrodes 30 in a direction of arrow E in FIG. 13. Accordingly, the single electrode 30 can be easily flipped.

In the present embodiment, description is provided on an example that the sheets 50 and the electrodes 30 are placed alternately in Z direction, that is, an example that the sheets 50 and the electrodes 30 are flipped alternately. However, not being limited to one, the number of electrodes 30 placed between the sheets 50 may be varied depending on design.

For example, it is also possible to alternately perform a process to flip two sheets 50 and a process to flip one electrode 30. In this case, some sheets 50 may not have the electrode 30 placed therebetween.

In contrast, it is also possible to alternately perform a process to flip one sheet 50 and a process to flip two or more electrodes 30. In this case, two or more electrodes 30 are placed between the sheets 50. Thus, the number of processes to flip the sheet 50 and the number of processes to flip the electrode 30 are varied based on design of the sheet-shaped secondary cell 500. Accordingly, the number of the electrodes 30 sandwiched by the sheets 50 can be varied.

After all the sheets 50 and the electrodes 30 are flipped, the electrode-use pallet 104 is moved (step S17), so that the electrode-use pallet 104 and the electrode holding portion 102 are to be close to the sheet holding portion 160. Specifically, the slide pin 101a is slidingly moved along the elongated hole 101b from the state illustrated in FIG. 7 to the state illustrated in FIG. 20. Since the slide pin 101a is inserted to the electrode-use pallet 104 and the electrode holding portion 102, the electrode-use pallet 104 and the electrode holding portion 102 are moved along +X direction. Accordingly, the electrodes 30 are moved in +X direction as well. According to the above, the electrodes 30 sandwiched between the sheets 50 are inserted to predetermined positions. That is, the electrodes 30 and the sheets 50 are overlapped by predetermined area. Here, the electrode holding guide 103 may be moved from the front of the electrode holding side face 102a before the electrode-use pallet 104 is slidingly moved so as not to disturb movement of the electrode-use pallet 104.

Figure 20:
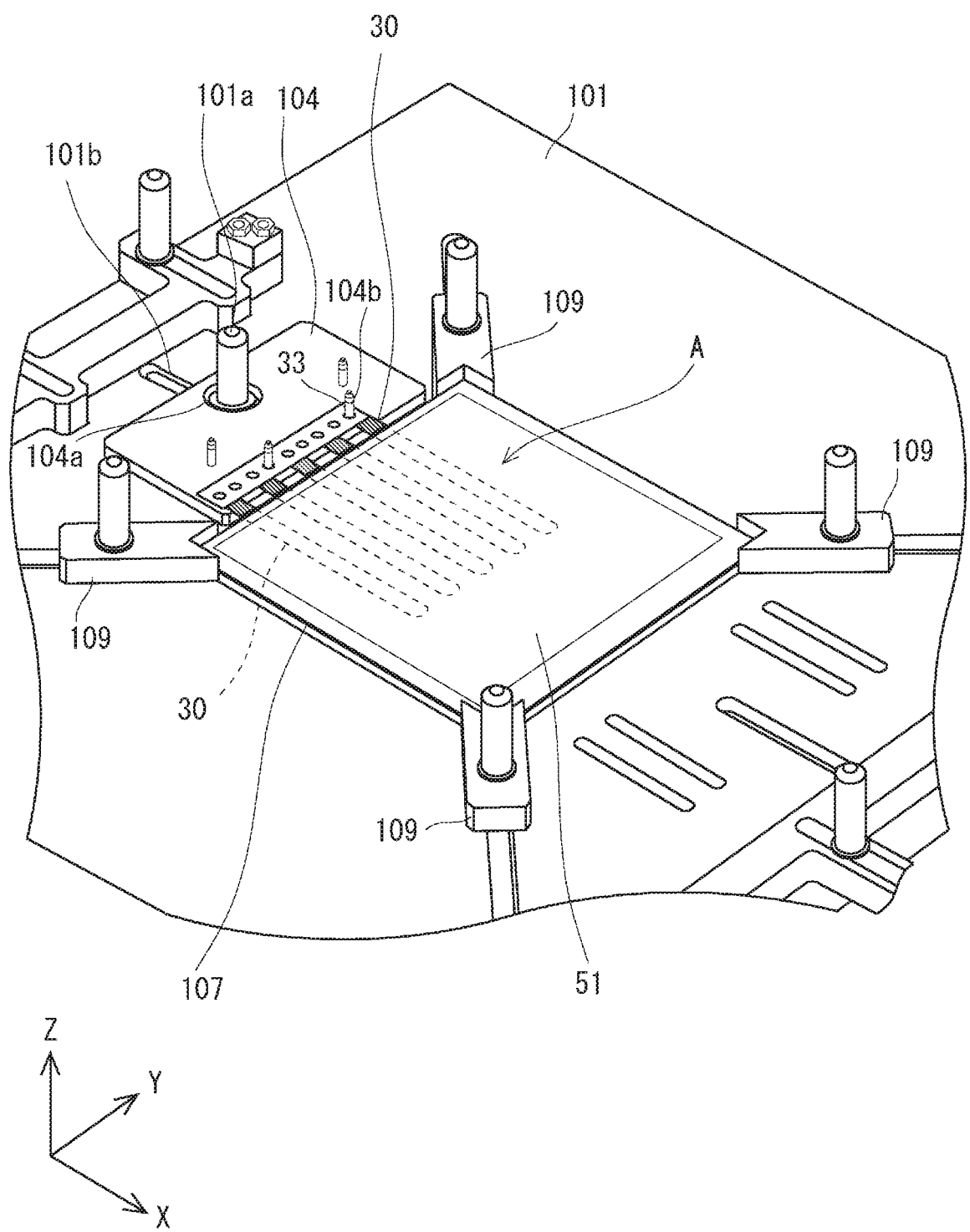
FIG. 20 is an explanatory view for a process to move an electrode-use pallet.

Further, as illustrated in FIG. 20, positioning holes 33 may be formed at the electrodes 30. The positioning pin 104b is inserted to the positioning hole 33. The positioning pin 104b is arranged at the electrode-use pallet 104. Thus, an end of the electrode 30 is fixed. According to the above, it is possible, when the electrode-use pallet 104 is moved, to prevent positional displacement of the electrodes 30 with respect to the sheets 50 to be caused by friction between the electrodes 30 and the sheets 50. Accordingly, movement of the electrode-use pallet 104 causes the electrodes 30 and the sheets 50 to be overlapped by predetermined area and the tab portions 31 to be extended from the sheet by predetermined area.

In the above description, the electrode 30 is flipped owing to that the electrode flipping rod 105 flips one electrode 30 from the electrodes 30 aligned in Y direction. However, the method to flip an electrode is not limited thereto. For example, it is also possible to flip the electrode 30 by forming air ejection holes at the electrode holding portion 102 on −X side. Specifically, the air ejection holes and air valves are arranged corresponding to the respective electrodes 30. Here, the electrodes 30 and the air ejection holes may be arranged as corresponding to each other on a one-to-one basis. Alternatively, one air ejection hole may be formed with respect to the electrodes 30. Then, air may be ejected through an air ejection hole corresponding to the electrode 30 to be flipped by controlling a plurality of air valves. According to air ejected through the air ejection holes, it is possible to flip the electrodes 30 one by one or plurality by plurality toward the work space A. Thus, the process to flip the electrodes 30 can be easily automated.

Further, there may be a case that the electrodes 30 are held as being overlapped to each other not being arranged in line along Y direction. In this case, a magnetic circuit being substantially the same as the magnetic circuit 20 housed in the sheet holding portion 160 is housed in the electrode holding portion 102 along the electrode holding side face 102a. Then, the electrodes 30 may be separated with magnetic force of the magnetic circuit. In this case, the electrodes 30 are made of a magnetic material.

In the above description, the electrodes 30 are inserted to the sheets 50 only from −X side. However, the electrodes 30 may be inserted from two or more directions. For example, the electrodes 30 may be inserted to the sheets 50 from at least one of +Y side and −Y side as well as +X side. That is, the tab portions 31 are arranged at two end sides or three end sides of the sheets 50. In this case, the electrode holding portion 102 is added to the sheet layering jig 100 to be oriented to the work space A from at least one direction of +Y side and −Y side.

Second Embodiment

Figure 21:
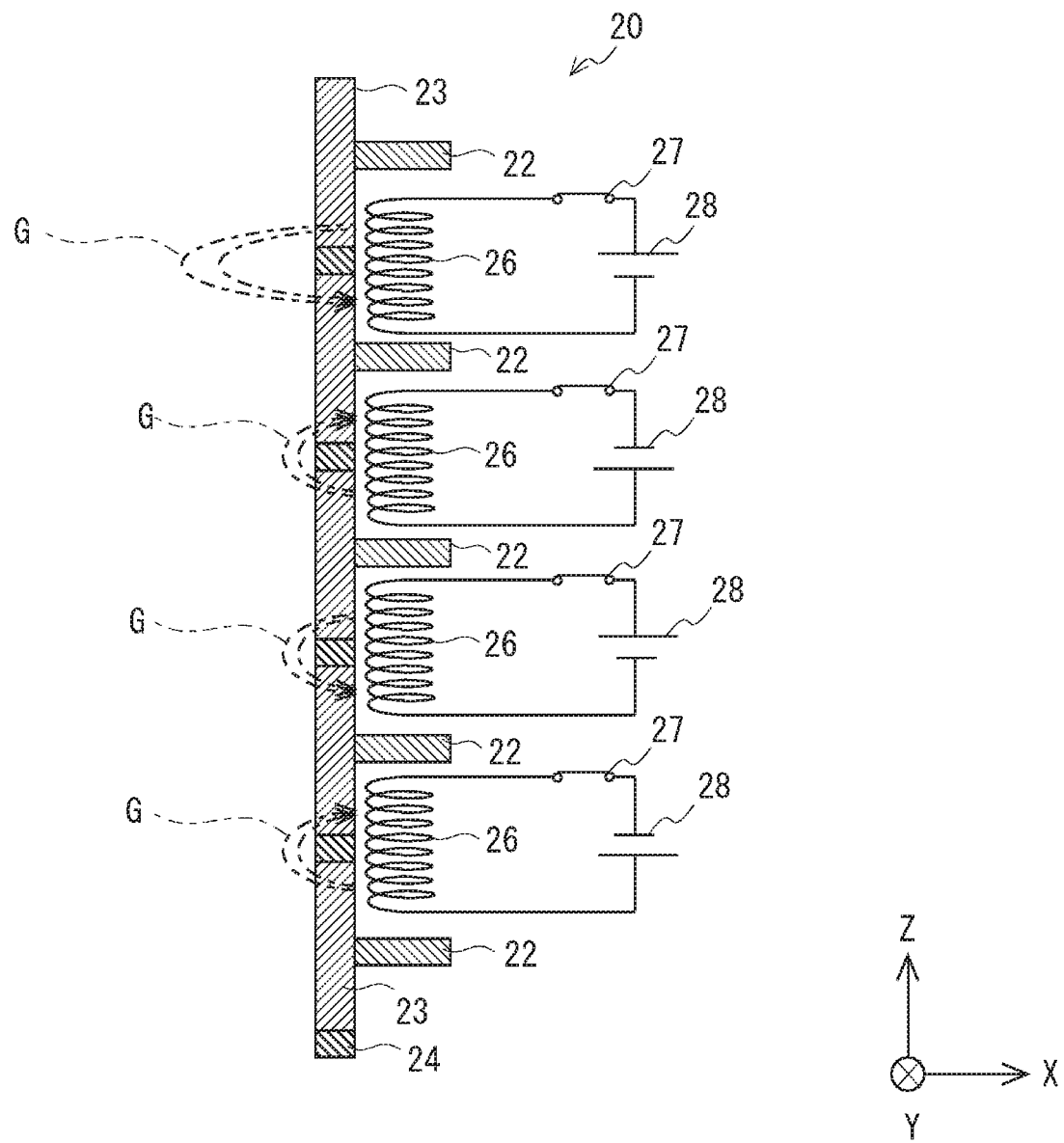
FIG. 21 is a view illustrating a structure of a magnetic circuit of a sheet layering jig of a second embodiment.

In a second embodiment, electric magnets are used in the magnetic circuit 20 instead of permanent magnets. Description will be provided on the magnetic circuit 20 used in the sheet layering jig 100 of the present embodiment with reference to FIG. 21. FIG. 21 is a view schematically illustrating the magnetic circuit 20. The basic structure of the sheet layering jig 100 is substantially the same as the first embodiment, description thereof will be appropriately skipped. In the present embodiment, the permanent magnets 21 in the first embodiment as illustrated in FIG. 18 and the like are replaced by electric magnets 26. Since magnetic lines are to be generated by the electric magnets 26, the slide portion 25 may not be needed.

The electric magnets 26 are arranged respectively between the first yokes 22. The electric magnets 26 are solenoid coils with axes thereof oriented in Z direction. In Z direction, one end of each electric magnet 26 serves as an S pole and the other end thereof serves as an N pole. Each electric magnet 26 is connected to a power source 28 on a one-to-one basis via a switch 27. Regarding the adjacent electric magnets 26, directions of current flow are opposite to each other, that is, connections to a positive electrode and a negative electrode of the corresponding power source 28 are opposite to each other. Thus, the electric magnets 26 are arranged in a state that the same poles are faced to each other.

The magnetic lines G being similar to those in the first embodiment can be generated by flowing current from the power sources 28 to the electric magnets 26. Accordingly, similarly to the first embodiment, the sheets 50 can be easily separated one by one from the layered body 51. Further, the separated state and the non-separated state can be switched only by ON/OFF operation of the switches 27, so that a mechanism to slide the second yokes 23 and the nonmagnetic members 24 becomes unnecessary. Accordingly, the apparatus structure can be simplified. Here, curvature of the sheets 50 may be adjusted by adjusting current values flowing from the power sources 28 to the electric magnets 26.

In the magnetic circuit 20, three or more of the electric magnets 26 are arranged in line in Z direction. Current to be supplied is adjusted so that magnetic force of the electric magnets 26 placed at the center region and one end region of the sheet holding side face 160a with respect to Z direction is smaller than that of the electric magnet 26 placed at the other end region of the sheet holding side face 160a. Specifically, current to be supplied to the electric magnet 26 at the one end region of the sheet holding side face 160a is larger than current to be supplied to the electric magnets 26 at the center region and the other end region. Alternatively, the number of turns of the electric magnet 26 at the one end region of the sheet holding side face 160a is larger than that of the electric magnets 26 at the center region and the other end region of the sheet holding side face 160a. Thus, adjustment is performed so that the three or more electric magnets 26 generate appropriate magnetic force. According to the above, magnetic force to be exerted on the upper end region of the sheets 50 becomes larger than magnetic force to be exerted on the center region and the lower end region of the sheets 50, so that the sheets can be curved appropriately. Accordingly, since gaps between the sheets 50 can be enlarged at the ends of the sheets 50, the sheets 50 can be easily separated from the layered body 51.

In the first embodiment, combination of the first direction in which the permanent magnets 21 are arranged, magnetic force of the permanent magnets 21, and a slide amount of the slide portion 25 may be varied in consideration of material and the like of the sheets 50. For example, in a case that material of the sheets 50 has low magnetic susceptibility, magnetic force of the permanent magnet 21 arranged at the end side of the sheet holding side face 160a may be set larger and a slide amount may be set larger than in a case that material of the sheets 50 has high magnetic susceptibility. In contrast, in a case that material of the sheets 50 has high magnetic susceptibility, the magnetic force may be set smaller and the slide amount may be set smaller than in a case that material of the sheets 50 has low magnetic susceptibility.

According to the above, since appropriate magnetic force without causing the sheets 50 to be magnetized can be set in accordance with material of the sheets 50, the sheets 50 can be effectively separated from the layered body 51.

In the second embodiment, combination of the first direction in which the electric magnets 26 are arranged, values of current to be flown to the electric magnets 26, and a slide amount of the slide portion 25 may be varied in consideration of the sheet remaining number of the layered body 51 and the like. For example, current to be flown to the electric magnets 26 and the slide amount may be lessened with decrease of the sheet remaining number of the layered body 51. According to the above, since strong magnetic field is not applied to the end of the layered body 51 having a small sheet remaining number, the sheets 50 can be effectively separated from the layered body 51.

Third Embodiment

Figure 22:
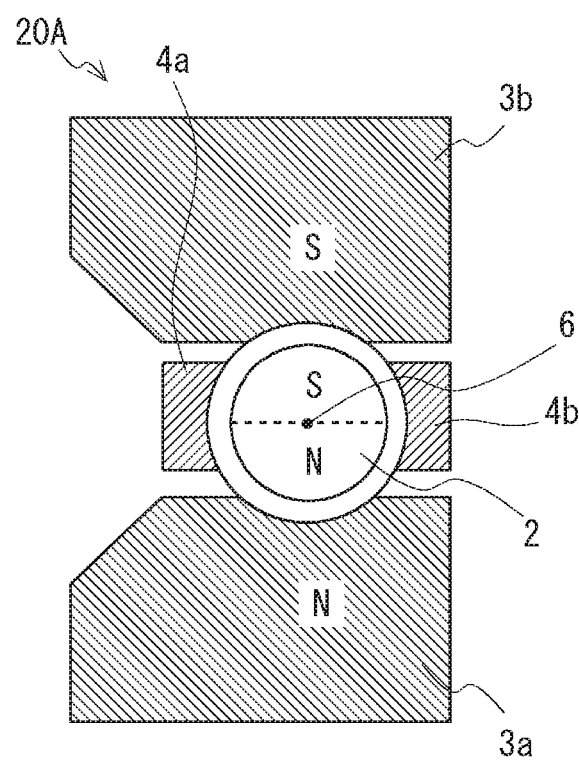
FIG. 22 is a view schematically illustrating a basic structure of a magnetic circuit different from that in FIG. 4.
Figure 22:
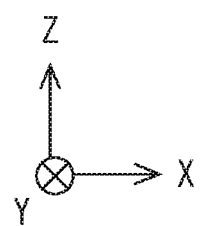

A sheet layering jig of a third embodiment is different from the first and second embodiments in structure of the magnetic circuit. In the following, description will be provided on a structure of a magnetic circuit 20A used in the sheet layering jig of the third embodiment with reference to FIG. 22. FIG. 22 is a view illustrating the magnetic circuit 20A having a basic principle different from the magnetic circuit 20 of FIG. 4.

The magnetic circuit 20A includes the permanent magnet 2, a first yoke 3a arranged at a lower end side of the permanent magnet 2, and a second yoke 3b arranged at an upper end side thereof. Further, the magnetic circuit 20A includes a first nonmagnetic member 4a arranged at an upper end side of the permanent magnet 2, and a second nonmagnetic member 4b arranged at a lower end side thereof, in X direction.

As illustrated in FIG. 22, the first yoke 3a and the second yoke 3b are arranged to be faced to each other along Z direction as sandwiching the permanent magnet 2. The first yoke 3a is arranged on −Z side and the second yoke 3b is arranged on +Z side with respect to the permanent magnet 2.

The permanent magnet 2 has a cylindrical shape with the axial direction thereof oriented in Y direction. In FIG. 22, a lower half serves as an N pole and an upper half serves as an S pole. The permanent magnet 2 is housed in the sheet holding portion 160 to be capable of being rotated about a rotation axis 6 being along a first direction of the sheet holding side face 160a (not illustrated in FIG. 22) in a state of being surrounded by the first yoke 3a, the second yoke 3b, the first nonmagnetic member 4a, and the second nonmagnetic member 4b. Here, for example, the first direction represents a direction being parallel to Y direction or a direction being rotated by a predetermined angle to ±X direction with respect to Y direction. When the permanent magnet 2 is rotated, positions of the N pole and the S pole are varied.

In the following, a method to separate a single sheet 50 from a plurality of sheets 50 using the magnetic circuit 20A will be described in two processes. The rotational angle of the permanent magnet 2 is different between first and second processes to be described later.

First Process

Figure 23:
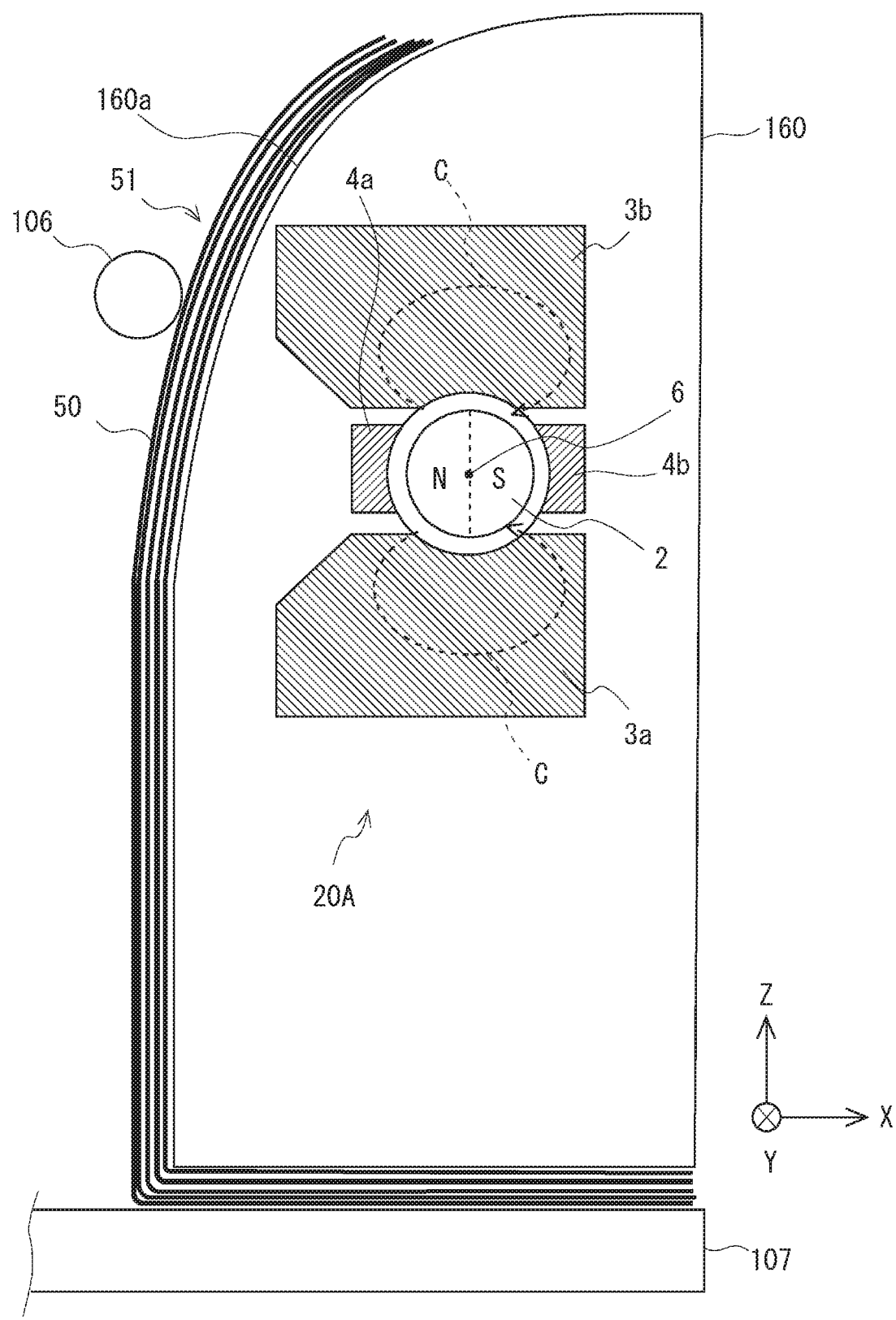
FIG. 23 is an explanatory view for a first process with the magnetic circuit in FIG. 22.

As illustrated in FIG. 23, in the first process, a layered body 51 is placed on the sheet holding side face 160a in a state that the N pole is located at a position corresponding to the first nonmagnetic member 4a arranged at −X side and the S pole is located at a position corresponding to the second nonmagnetic member 4b arranged at +X side. In a case that the permanent magnet 2 is located as described above, magnetic lines C do not reach any of the sheets 50 without exiting from the sheet holding portion 160. Accordingly, magnetic lines C of the permanent magnet 2 from the N pole to the S pole pass through the inside of the first yoke 3a or the second yoke 3b. Thus, magnetic lines C do not pass through the sheet holding side face 160a.

In FIG. 23, although the N pole is located at +X side and the S pole is located at the −X side thereof, the N pole and the S pole may be arranged oppositely. That is, it is possible that the N pole is arranged at −X side and the S pole is arranged at +X side. In any case, the sheets 50 is placed on the sheet holding side face 160a in a state that one pole of the permanent magnet 2 is located at a position corresponding to the first nonmagnetic member 4a and the other pole thereof is located at a position corresponding to the second nonmagnetic member 4b.

Second Process

In the second process, the permanent magnet 2 is rotated counterclockwise about the rotational axis 6 by 90 degrees, so that the N pole is moved to a position corresponding to the first yoke 3a and the S pole is moved to a position corresponding to the second yoke 3b. Thus, the permanent magnet 2 becomes into a state illustrated in FIG. 24. In this state, since the N pole is strengthened by the first yoke 3a and the S pole is strengthened by the second yoke 3b, magnetic lines D from the N pole to the S pole reach the sheet holding side face 160a.

According to the magnetic lines D, gaps are generated between the sheets 50. In other words, a single sheet 50 can be separated from the sheets 50 by rotating the permanent magnet 2.

Magnitude of magnetic force reaching the sheet holding side face 160a can be varied by the rotational angle of the permanent magnet 2. For example, in a case that the number of the sheets 50 is small, the rotational angle of the permanent magnet 2 is set smaller than in a case that the number of the sheets 50 is large, so that magnetic force reaching the sheet holding side face 160a can be lessened. Thus, not limited to 90 degrees, the rotational angle of the permanent magnet 2 can be set to any angle.

In the second process, the permanent magnet 2 may be rotated about the rotational axis 6 clockwise not counterclockwise by 90 degrees to move the N pole to the position corresponding to the second yoke 3b and the S pole to the position corresponding to the first yoke 3a. Even when the permanent magnet 2 is rotated as described above, since the N pole is strengthened by the second yoke 3b and the S pole is strengthened by the first yoke 3a, magnetic lines from the N pole to the S pole reach the sheet holding side face 160a. Thus, in the second process, the permanent magnet 2 is rotated about the rotational axis 6 to move one pole of the permanent magnet 2 to a position corresponding to the first yoke 3a and the other pole to a position corresponding to the second yoke 3b.

Figure 24:
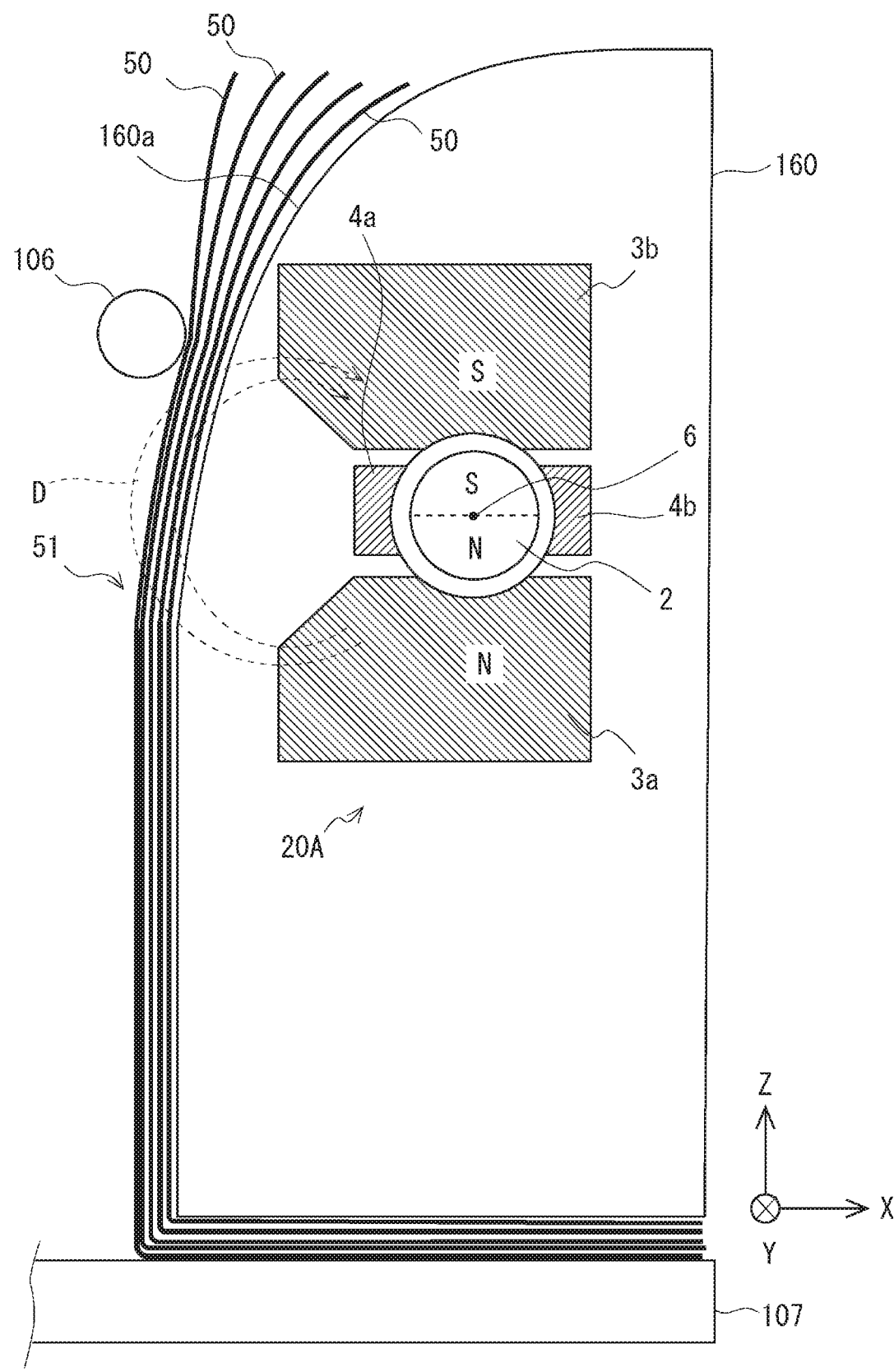
FIG. 24 is an explanatory view for a second process with the magnetic circuit in FIG. 22.

The magnetic circuit 20A illustrated in FIGS. 22 to 24 may be adopted in place of the magnetic circuit 20 having the permanent magnets 21 of the first embodiment or the magnetic circuit 20 having the electric magnets 26 of the second embodiment. In this case, the magnetic circuit 20A is housed in the sheet holding portion 160 so that the rotational axis 6 is oriented in Y direction or a direction being rotated by a predetermined angle to ±X direction with respect to Y direction or the first direction is oriented in Z direction or a direction being inclined from Z direction to +Y direction or −Y direction.

In the above, description is provided on examples of the embodiments of the present invention. Here, the present invention includes appropriate modifications as long as not impairing objects and advantages thereof. Further, the present invention is not limited to the abovementioned embodiments.

This application is based upon and claims the benefit of priority from Japanese patent application No. 2016-75641, filed on Apr. 5, 2016, the disclosure of which is incorporated herein in its entirety by reference.

REFERENCE SIGNS LIST

100 Sheet layering jig
101 Stage
102 Electrode holding portion
102a Electrode holding side face
102b Groove
103 Electrode holding guide
104 Electrode-use pallet
105 Electrode flipping rod
106 Sheet holding guide
107 Sheet-use pallet
108 Tweezers
109 Positioning block
160 Sheet holding portion
160a Sheet holding side face
30 Electrode
50 Sheet
12 Lever
20 Magnetic circuit
21 Permanent magnet
22 First yoke
23 Second yoke
24 Nonmagnetic member
25 Slide portion
26 Electric magnet
27 Switch
28 Power source
500 Sheet-shaped secondary cell

The invention claimed is:

1. A sheet layering jig for manufacturing a layered product in which a component is arranged between layered sheets, comprising:
   a stage;
   a sheet holding portion that includes a sheet holding side face to hold a plurality of sheets and is arranged on the stage so that the sheet holding side face faces a work space on the stage;
   a component holding portion that includes a component holding side face to hold a plurality of components and is arranged on the stage so that the component holding side face faces the sheet holding side face as sandwiching the work space;
   a sheet holding guide that holds the sheets along the sheet holding side face;
   a component holding guide that holds the components along the component holding side face; and
   a magnetic circuit that is arranged at the sheet holding portion and generates magnetic force to generate a gap between the sheets at an end region of the sheets.

2. The sheet layering jig according to claim 1, further comprising a sheet grasping member that grasps a single sheet out of the sheets arranged along the sheet holding side face in a state that a gap is generated between the sheets by the magnetic force of the magnetic circuit so that the single sheet is flipped toward the work space.

3. The sheet layering jig according to claim 1,
   wherein the magnetic circuit includes a plurality of magnets arranged in line in a first direction with the same poles of adjacent magnets being faced to each other, a first yoke arranged at each of both sides of each magnet, a nonmagnetic member arranged at a position corresponding to each first yoke, and a second yoke arranged at a position corresponding to each magnet.

4. The sheet layering jig according to claim 3,
   wherein the magnets are permanent magnets, and
   the second yokes and the nonmagnetic members are arranged movably in the first direction.

5. The sheet layering jig according to claim 4,
   wherein the first direction is oriented along the sheet holding side face,
   three or more of the permanent magnets are arranged in line in the first direction, and
   magnetic force of the permanent magnets arranged at a center region and one end region of the sheet holding side face with respect to the first direction is smaller than magnetic force of the permanent magnet arranged at the other end region of the sheet holding side face.

6. The sheet layering jig according to claim 3, wherein the magnets are electric magnets.

7. The sheet layering jig according to claim 6,
   wherein three or more of the electric magnets are arranged in line in the first direction,
   the first direction is oriented along the sheet holding side face, and
   current is flown to the electric magnets so that magnetic force of the electric magnets arranged at a center region and one end region of the sheet holding side face with respect to the first direction is smaller than magnetic force of the electric magnet arranged at the other end region of the sheet holding side face.

8. The sheet layering jig according to claim 1, further comprising a component flipping member that is arranged between the component holding side face and the components held along the component holding side face,
wherein the components are arranged in line along an insertion direction of the component flipping member, and
the component flipping member flips the components one by one toward the work space.

9. The sheet layering jig according to claim 1, wherein the magnetic circuit includes a permanent magnet, a first yoke arranged at one end side of the permanent magnet, a second yoke arranged at the other end side of the permanent magnet, a first nonmagnetic member arranged at an upper end side of the permanent magnet, and a second nonmagnetic member arranged at a lower end side of the permanent magnet.

10. The sheet layering jig according to claim 9, wherein the permanent magnet is rotatable about a rotational axis along a first direction on the sheet holding side face.

11. A method for manufacturing a layered product using the sheet layering jig according to claim 1, comprising steps of:
arranging the sheet holding portion and the plurality of sheets on the stage;
holding the sheets along the sheet holding side face by lifting the sheets placed at the work space;
arranging the component holding portion and the plurality of components on the stage;
holding the components along the component holding side face by lifting the components placed at the work space;
generating a gap between the sheets at an end region of the sheets using the magnetic circuit; and
flipping a topmost sheet out of the plurality of sheets toward the work space with a gap generated between the sheets, and thereafter, flipping one more components out of the plurality of components on the flipped topmost sheet.

12. A method for manufacturing a layered product using the sheet layering jig according to claim 10, comprising:
a first step to hold the sheets on the sheet holding side face in a state that one pole of the permanent magnet is located at a position corresponding to the first nonmagnetic member and the other pole of the permanent magnet is located at a position corresponding to the second nonmagnetic member; and
a second step to move one pole of the permanent magnet to a position corresponding to the first yoke and the other pole of the permanent magnet to a position corresponding to the second yoke by rotating the permanent magnet about the rotational axis.

13. A method for manufacturing a sheet-shaped secondary cell with the method for manufacturing a layered product according to claim 11,
wherein the sheets are unit cell sheets each including a charging layer, and
the components are electrodes to be connected to the unit cell sheets.

* * * * *